(12) United States Patent
Stayskal

(10) Patent No.: US 12,088,705 B2
(45) Date of Patent: *Sep. 10, 2024

(54) SECURE DISTRIBUTION OF ENTROPY

(71) Applicant: Oracle International Corporation, Redwood Shores, CA (US)

(72) Inventor: Danne Lauren Stayskal, Eastsound, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/151,839

(22) Filed: Jan. 9, 2023

(65) Prior Publication Data
US 2023/0163960 A1 May 25, 2023

Related U.S. Application Data

(63) Continuation of application No. 17/185,646, filed on Feb. 25, 2021, now Pat. No. 11,582,030.

(51) Int. Cl.
*H04L 29/06* (2006.01)
*H04L 9/08* (2006.01)
*H04L 9/32* (2006.01)

(52) U.S. Cl.
CPC .......... *H04L 9/0852* (2013.01); *H04L 9/0841* (2013.01); *H04L 9/0861* (2013.01); *H04L 9/3215* (2013.01)

(58) Field of Classification Search
None
See application file for complete search history.

(56) References Cited

U.S. PATENT DOCUMENTS

| 6,628,786 B1 | 9/2003 | Dole |
| 6,801,626 B1 | 10/2004 | Nambu |
| 7,430,295 B1 * | 9/2008 | Pearson ................. H04B 10/70 380/278 |

(Continued)

FOREIGN PATENT DOCUMENTS

| EP | 2073430 A1 | 6/2009 |
| GB | 2491896 A | 12/2012 |

OTHER PUBLICATIONS

International Application No. PCT/US2021/023889, International Preliminary Report on Patentability mailed on Sep. 7, 2023, 9 pages.

(Continued)

*Primary Examiner* — Maung T Lwin
(74) *Attorney, Agent, or Firm* — Kilpatrick Townsend & Stockton LLP

(57) ABSTRACT

Techniques are disclosed for securely distributing entropy in a distributed environment. The entropy that is distributed may be quantum entropy that is generated by a quantum entropy generator or source. The true random entropy generated by a trusted entropy generator can be communicated securely among computer systems or hosts using secure communication channels that are set up using a portion of the entropy. The distribution techniques enable computer systems and hosts, which would otherwise not have access to such entropy generated by the trusted entropy source, to have access to the entropy.

15 Claims, 8 Drawing Sheets

(56) References Cited

U.S. PATENT DOCUMENTS

| | | | |
|---|---|---|---|
| 7,620,182 B2* | 11/2009 | Berzanskis | H04L 9/065 380/256 |
| 7,697,693 B1 | 4/2010 | Elliott | |
| 7,889,868 B2 | 2/2011 | Wellbrock et al. | |
| 7,983,422 B2 | 7/2011 | Kent et al. | |
| 8,483,394 B2 | 7/2013 | Nordholt et al. | |
| 8,738,676 B2 | 5/2014 | Inglett et al. | |
| 9,086,936 B2 | 7/2015 | Inglett et al. | |
| 9,246,674 B2 | 1/2016 | Brainis et al. | |
| 9,509,506 B2 | 11/2016 | Hughes et al. | |
| 9,680,640 B2 | 6/2017 | Hughes et al. | |
| 10,348,704 B2 | 7/2019 | Figueira | |
| 11,218,471 B1* | 1/2022 | Stapleton | H04L 63/061 |
| 11,343,084 B2* | 5/2022 | Nix | H04L 9/0618 |
| 11,582,030 B2 | 2/2023 | Stayskal | |
| 11,621,836 B2* | 4/2023 | Ashrafi | H04L 9/3239 713/171 |
| 2006/0088157 A1* | 4/2006 | Fujii | H04L 9/0858 380/30 |
| 2010/0046755 A1* | 2/2010 | Fiske | H04L 9/0822 380/278 |
| 2011/0280405 A1* | 11/2011 | Habif | H04B 10/70 380/278 |
| 2013/0083926 A1 | 4/2013 | Hughes et al. | |
| 2016/0149700 A1 | 5/2016 | Fu et al. | |
| 2020/0145236 A1 | 5/2020 | Sethi et al. | |
| 2020/0280436 A1 | 9/2020 | Nix | |
| 2020/0403787 A1 | 12/2020 | Islam et al. | |

OTHER PUBLICATIONS

"Hardware Random Number Generator", Wikipedia, Available online at: https://en.wikipedia.org/wiki/Hardware_random_number_generator#Quantum_random_properties, Mar. 5, 2021, 10 pages.

"Post-Quantum Cryptography", Wikipedia, Available online at: https://en.wikipedia.org/wiki/Post-quantum_cryptography, Mar. 5, 2021, 14 pages.

"Quantum Versus Classical Random Number Generators", ID Quantique, May 2020, 17 pages.

"The Case for Strong Encryption Keys", ID Quantique, Available Online at—https://www.idquantique.com/strong-encryption-keys/#:~:text=On%20a%20very%20basic%20level,more%20secure%20the%20key%20is., Apr. 27, 2017, 2 pages.

"What is the Q in QRNG Random Number Generation White Paper", Available Online at—https://marketing.idquantique.com/acton/attachment/11868/f-0226/1/-/-/-/-/, May 2020, 16 pages.

"What is the Q in QRNG Random Number Generation White Paper", ID Quantique, Random Number Generation White Paper, Available Online at—https://marketing.idquantique.com/acton/attachment/11868/f-0226/1/-/-/-/-/, May 2020, 16 pages.

"When Random Numbers Cannot Be Left to Chance Why Quantum Random Numbergeneration?", Available online at: https://www.idquantique.com/random-numbergeneration/overview/, Mar. 5, 2021, 5 pages.

U.S. Appl. No. 17/185,646 , Non-Final Office Action, Mailed on Sep. 2, 2022, 9 pages.

U.S. Appl. No. 17/185,646 , Notice of Allowance, Mailed on Nov. 30, 2022, 12 pages.

Arnon-Friedman et al., "Practical Device-Independent Quantum Cryptography via Entropy Accumulation", Nature Communications, vol. 9, No. 459, Jan. 31, 2018, pp. 1-11.

Jacak et al., "Quantum Random Number Generators with Entanglement for Public Randomness Testing", Scientific Reports, vol. 10, No. 164, Jan. 13, 2020, pp. 1-9.

Neumann , "Anyone Who Considers Arithmetical Methods of Producing Random Digits is, of Course, in a State of Sin", ID Quantique, Random Number Generation Using Quantum Physics, Version 3.0, Apr. 2010, pp. 1-8.

Application No. PCT/US2021/023889 , International Search Report and Written Opinion, Mailed on Oct. 25, 2021, 13 pages.

Stipcevic , "Quantum Random Number Generators and their use in Cryptography", Proceedings of the 34th International Convention MIPRO, 2011, 6 pages.

* cited by examiner

600

```
┌─────────────────────────────────────────────────────────────────┐
│ GENERATE A SECOND SET OF ONE OR MORE CRYPTOGRAPHIC KEYS, WHERE  │
│ THE FIRST HOST COMPUTER GENERATES A FIRST SET OF ONE OR MORE    │
│ CRYPTOGRAPHIC KEYS USING A FIRST PORTION OF QUANTUM ENTROPY     │
│                            S602                                 │
└─────────────────────────────────────────────────────────────────┘
                                │
                                ▼
┌─────────────────────────────────────────────────────────────────┐
│ USE THE SECOND SET OF ONE OR MORE CRYPTOGRAPHIC KEYS AND THE    │
│ FIRST SET OF ONE OR MORE CRYPTOGRAPHIC KEYS TO ESTABLISH AN     │
│ INITIAL COMMUNICATION CHANNEL WITH THE SECOND HOST COMPUTER     │
│         (E.G., USING A DIFFIE-HELLMAN EXCHANGE)                 │
│                            S604                                 │
└─────────────────────────────────────────────────────────────────┘
                                │
                                ▼
┌─────────────────────────────────────────────────────────────────┐
│ RECEIVE A SECOND PORTION OF THE QUANTUM ENTROPY FROM THE FIRST  │
│        HOST COMPUTER VIA THE INITIAL COMMUNICATION CHANNEL      │
│                            S606                                 │
└─────────────────────────────────────────────────────────────────┘
                                │
                                ▼
┌─────────────────────────────────────────────────────────────────┐
│ GENERATE A FOURTH SET OF ONE OR MORE CRYPTOGRAPHIC KEYS USING   │
│ THE SECOND PORTION OF THE QUANTUM ENTROPY, WHERE THE FIRST HOST │
│ COMPUTER GENERATES A THIRD SET OF ONE OR MORE CRYPTOGRAPHIC     │
│ KEYS USING A THIRD PORTION OF THE QUANTUM ENTROPY               │
│                            S608                                 │
└─────────────────────────────────────────────────────────────────┘
                                │
                                ▼
┌─────────────────────────────────────────────────────────────────┐
│ USE THE FOURTH SET ONE OR MORE CRYPTOGRAPHIC KEYS AND THE THIRD │
│ SET OF ONE OR MORE CRYPTOGRAPHIC KEYS TO ESTABLISH A SECURE     │
│ COMMUNICATION CHANNEL WITH THE FIRST HOST COMPUTER              │
│         (E.G., USING A DIFFIE-HELLMAN EXCHANGE)                 │
│                            S610                                 │
└─────────────────────────────────────────────────────────────────┘
                                │
                                ▼
┌─────────────────────────────────────────────────────────────────┐
│ RECEIVE A FOURTH PORTION OF THE QUANTUM ENTROPY FROM THE FIRST  │
│        HOST COMPUTER VIA THE SECURE COMMUNICATION CHANNEL       │
│                            S612                                 │
└─────────────────────────────────────────────────────────────────┘
                                │
                                ▼
┌─────────────────────────────────────────────────────────────────┐
│ AFTER A CERTAIN CONDITION, GENERATE NEW KEYS TO RENEW CHANNEL   │
│                 AND/OR ESTABLISH NEW CHANNEL                    │
│                            S614                                 │
└─────────────────────────────────────────────────────────────────┘
```

*FIG. 6*

SECURE DISTRIBUTION OF ENTROPY

BACKGROUND

Entropy (also referred to as entropy information) is used for various different purposes. For example, entropy is vitally important for cryptographic systems that use the entropy to generate cryptographic keys for various purposes. The trust that can be placed in these cryptographic systems and the keys generated by these systems is however limited by the trust that can be placed on the quality of the entropy that is used by these systems to generate the keys. Firstly, generating true random entropy or finding a trusted source capable of generating true random entropy is difficult. Even if such a source is found, communicating the entropy from the entropy source to a computer where the entropy is to be used (e.g., by a cryptographic system for generating a cryptographic key) while ensuring that the entropy has not been tampered with is a non-trivial problem. Poor quality of tampered-with entropy can lead to weak or compromised cryptographic keys that are susceptible to a variety of collision and side-channel attacks. As a result, most computing devices and applications (e.g., programs, virtual machines) do not have access to truly randomized high quality entropy.

BRIEF SUMMARY

The present disclosure relates generally to the secure distribution of entropy. The entropy that is distributed may be quantum entropy that is generated by a quantum entropy generator or source. The teachings described herein enable true random entropy generated by a trusted entropy generator to be communicated securely among computer systems or hosts using secure communication channels that are set up using a portion of the entropy. The distribution techniques enable computer systems and hosts, which would otherwise not have access to such entropy generated by the trusted entropy source, to have access to the entropy. Various embodiments are described herein, including methods, systems, non-transitory computer-readable storage media storing programs, code, or instructions executable by one or more processors, and the like.

In certain embodiments, a method comprises receiving, by a first host, entropy information from an entropy source; establishing a communication channel between the first host and a second host using one or more cryptographic keys, wherein all of the one or more cryptographic keys are generated using at least a portion of the entropy information; and communicating, from the first host to the second host, an additional portion of the entropy information using the communication channel established between the first host and the second host.

In yet another embodiment, the communication channel is a second communication channel, and the method further comprises: establishing a first communication channel between the first host and the second host based upon a first set of one or more cryptographic keys generated by the first host using a first portion of the entropy information and based upon a second set of one or more cryptographic keys generated by the second host; and communicating a second portion of the entropy information from the first host to the second host using the first communication channel.

In yet another embodiment, the step of establishing the second communication channel comprises: generating, by the first host, a third set of one or more cryptographic keys using a third portion of the entropy information; generating, by the second host, a fourth set of one or more cryptographic keys using a first portion of the second portion of the entropy information received by the second host from the first host; and establishing the second communication channel between the first host and the second host based upon the third set of one or more cryptographic keys and the fourth set of one or more cryptographic keys.

In yet another embodiment, the method further comprises determining that a condition associated with the second communication channel is met; responsive to determining that the condition is met: regenerating, by the first host, a first new set of one or more cryptographic keys using a fifth portion of the entropy information; regenerating, by the second host, a second new set of one or more cryptographic keys using a second portion of the second portion of the entropy information received by the second host from the first host; and establishing a new communication channel between the first host and the second host based upon the first new set of one or more cryptographic keys and the second new set of one or more cryptographic keys.

In yet another embodiment, the step of determining that the condition associated with the second communication channel is met comprises determining that a certain period of time has elapsed.

In yet another embodiment, the step of determining that the condition associated with the second communication channel is met comprises determining that a certain number of packets have been exchanged between the first host and the second host.

In yet another embodiment, the second portion of the entropy information includes "N" bits, and wherein the second host generates the fourth set of one or more cryptographic keys based on the "N" bits.

In yet another embodiment, the step of establishing the first communication channel includes performing a first Diffie-Hellman key exchange using the first set of one or more cryptographic keys and the second set of one or more cryptographic keys, and wherein establishing the second communication channel includes performing a second Diffie-Hellman key exchange using the third set of one or more cryptographic keys and the fourth set of one or more cryptographic keys.

In yet another embodiment, the first Diffie-Hellman key exchange is a first Elliptic-curve Diffie-Hellman key exchange, and wherein the second Diffie-Hellman key exchange is a second Elliptic-curve Diffie-Hellman key exchange.

In yet another embodiment, the entropy source is a quantum entropy generator, and the entropy information is quantum entropy.

In yet another embodiment, the first host is hosted by a first host machine and the second host is hosted by a second host machine.

In yet another embodiment, the step of receiving the entropy information comprises receiving, by the first host, the entropy information from the entropy source as a stream of information.

The foregoing, together with other features and embodiments will become more apparent upon referring to the following specification, claims, and accompanying drawings.

BRIEF DESCRIPTION OF THE DRAWINGS

FIG. 6 depicts a simplified flowchart depicting steps performed by a second host during a process for distributing or communicating entropy information generated by a quantum entropy generator to multiple hosts or compute instances according to certain embodiments.

DETAILED DESCRIPTION

Figure 1:
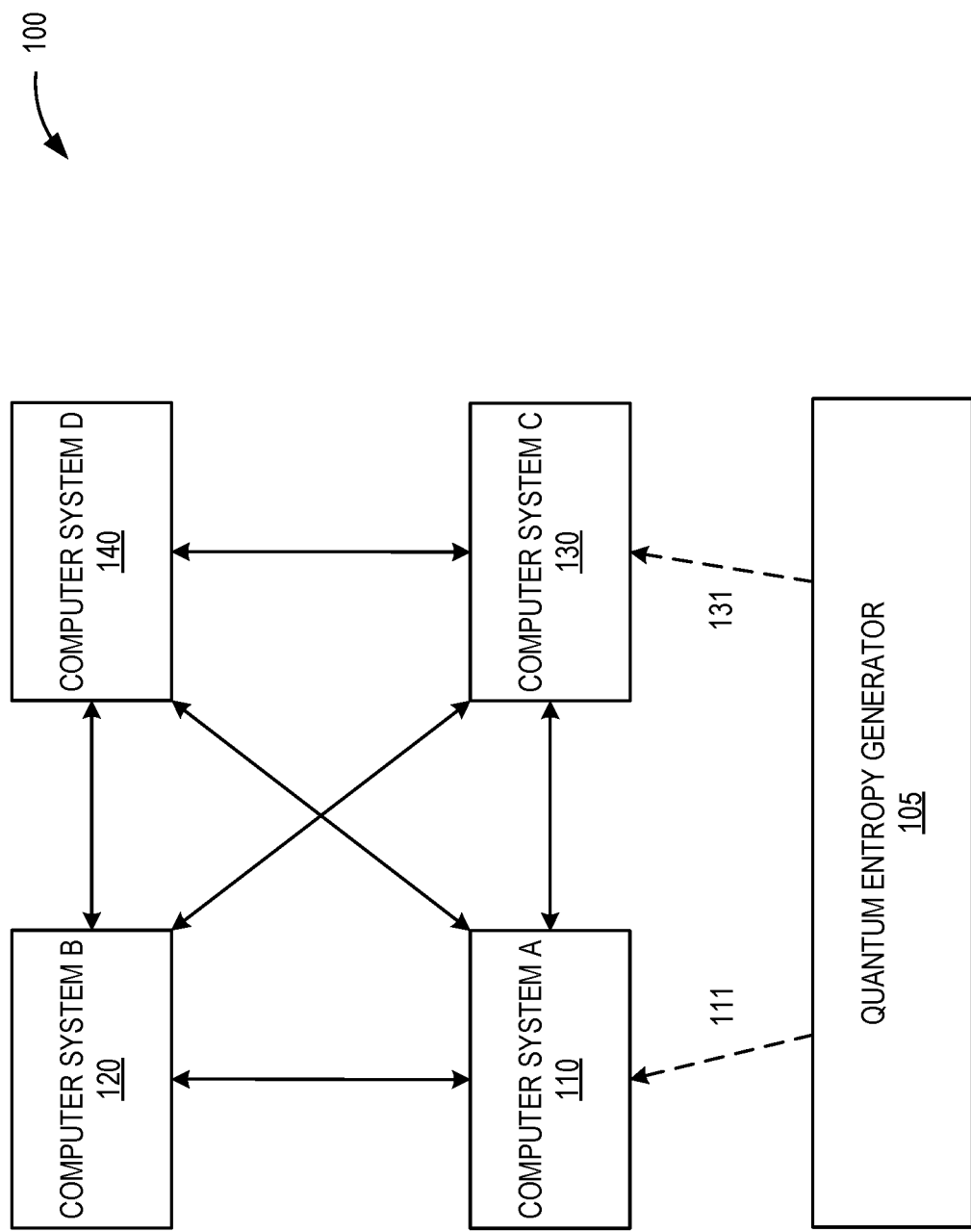
FIG. 1 is a simplified block diagram of a distributed environment according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to the secure distribution of entropy. The entropy that is distributed may be quantum entropy that is generated by a quantum entropy generator or source. The teachings described herein enable true random entropy generated by a trusted entropy generator to be communicated securely among computer systems or hosts using secure communication channels that are set up using a portion of the entropy. The distribution techniques enable computer systems and hosts, which would otherwise not have access to such entropy generated by the trusted entropy source, to have access to the entropy.

In certain implementations, novel distribution techniques are described for securely communicating entropy from an entropy source to a computer system that is directly connected to the entropy source and further for securely communicating the entropy from this computer system to other computer systems in a distributed environment, where the other computer systems may not be directly connected to the entropy source. In certain implementations, a computer system that is directly connected to an entropy source receives entropy information from the entropy source securely via the direct secure connection. The computer system receiving the entropy from the entropy source can then communicate or distribute the received entropy or portions thereof to one or more other computer systems that are communicatively coupled with the computer system but which may not be directly connected to the entropy source. The communication of entropy from a directly-connected computer system to other computer systems, which may not be directly connected to the entropy source, is performed over a secure communication channel that is set up using a portion of the entropy generated by the entropy source and received by the computer system that is directly connected to the entropy source. A computer system receiving the entropy source-generated entropy from another computer system can in turn use the methods described in this disclosure to distribute the entropy or portions thereof to yet other computer systems via secure communication channels set up using a portion of the received entropy.

In certain implementations, novel distribution techniques are described for securely communicating entropy from an entropy source to a host that is directly connected to the entropy source and further for securely communicating the entropy from this host to other hosts in a distributed environment, where the other hosts may not be directly connected to the entropy source. A host can be a virtual machine compute instance or a bare metal compute instance. In certain implementations, a host that is directly connected to an entropy source receives entropy information from the entropy source securely via the direct secure connection. The host receiving the entropy from the entropy source can then communicate or distribute the received entropy or portions thereof to one or more other hosts that are communicatively coupled with the first host but which may not be directly connected to the entropy source. The communication of entropy from a directly-connected host to other hosts, which may not be directly connected to the entropy source, is performed over a secure communication channel that is set up using a portion of the entropy generated by the entropy source and received by the host that is directly connected to the entropy source. A host receiving the entropy source-generated entropy from another host can in turn use the methods described in this disclosure to distribute the entropy or portions thereof to yet other hosts via secure communication channels set up using a portion of the received entropy.

For purposes of this disclosure, the terms "entropy" and "entropy information" are used synonymously. Various embodiments are described herein, including methods, systems, non-transitory computer-readable storage media storing programs, code, or instructions executable by one or more processors, and the like.

FIG. 1 is a simplified block diagram of a distributed environment 100 according to some embodiments. The distributed environment 100 may comprise multiple computer systems communicatively coupled to each other via one or more communication links over one or more communication networks. The distributed environment 100 in FIG. 1 includes a computer system A 110, a computer system B 120, a computer system C 130, a computer system D 140, and a quantum entropy generator 105.

The distributed environment depicted in FIG. 1 is merely an example and is not intended to unduly limit the scope of claimed embodiments. Many variations, alternatives, and modifications are possible. For example, in some implementations, the distributed environment 100 may have more or fewer computer systems or components than those shown in FIG. 1, or may have a different configuration or arrangement of computer systems and communication lines.

The computer systems depicted in FIG. 1 may each comprise compute (e.g., one or more processors or CPUs), memory (e.g., system memory, non-volatile memory), and networking resources (e.g., network interface cards (NICs). A computer system may communicate with one or more other computer systems using these network resources over one or more communication networks. The communication networks may include, for example, the Internet, an intranet, an extranet, a Local Area Network (LAN), a Wide Area Network (WAN), and other networks facilitating communications, and combinations thereof. The communications may occur over wired or wireless links using one or more wired or wireless communication protocols.

One or more of the computer systems depicted in FIG. 1 may execute one or more applications that utilize entropy information. For example, a computer system may execute an application that generates one or more cryptographic keys and entropy information is used for generation of these keys. The cryptographic keys may be used for different purposes, such as for securing stored information, enabling communications with other computer systems, for authentication/authorization of users, and the like. The entropy information used for these applications may need high quality truly randomized entropy. The computer systems may not be capable of generating such high quality entropy information on their own.

Figure 2:
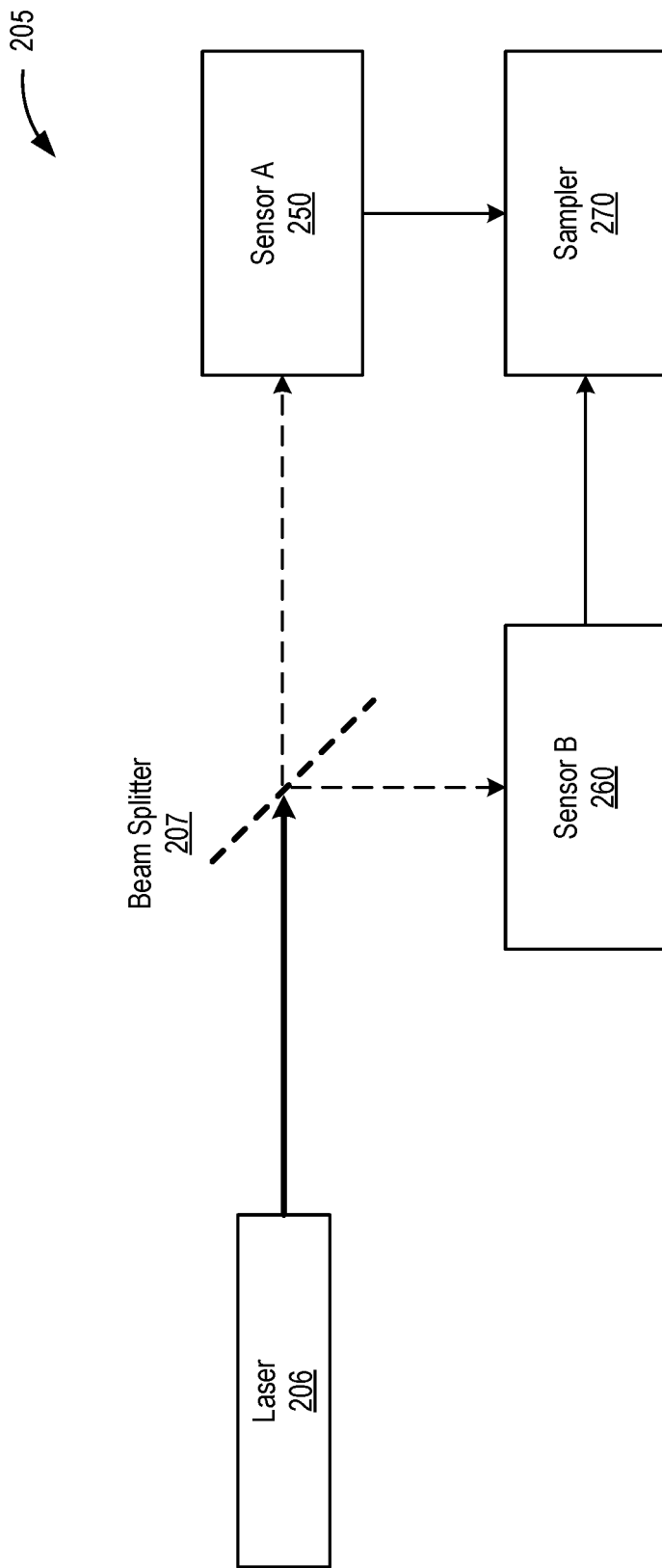
FIG. 2 shows an example of a quantum entropy generator.
Figure 5:
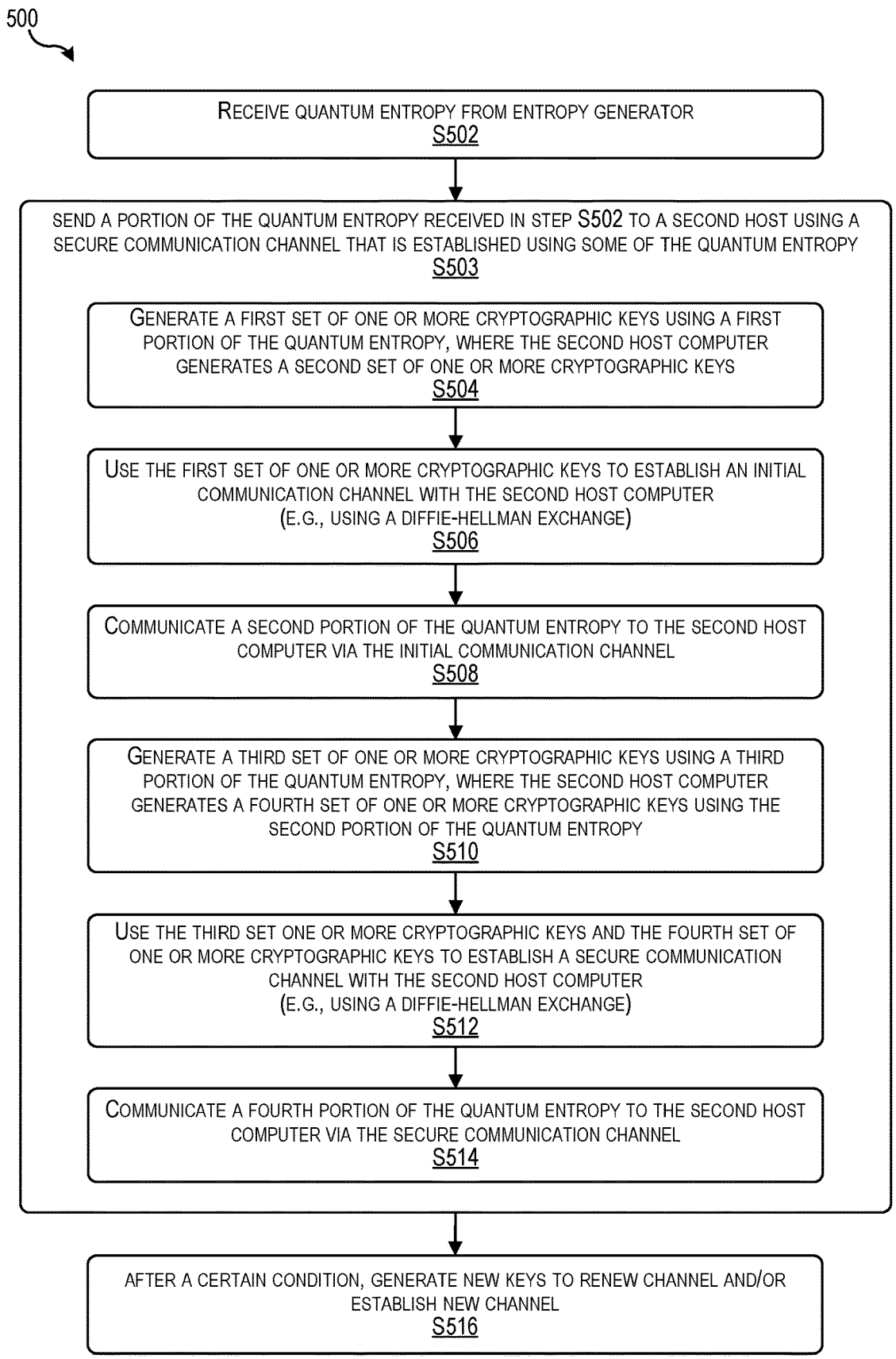
FIG. 5 depicts a simplified flowchart depicting steps performed by a first host during a process for distributing or communicating entropy information generated by a quantum entropy generator to multiple hosts or compute instances, according to certain embodiments.

There are various types of entropy generators capable of generating different qualities of entropy. Quantum entropy is considered high quality truly randomized entropy due the quantum-physical properties involved in generation of quantum entropy. Accordingly, a quantum entropy generator is capable of generating high quality entropy. One such quantum entropy generator 105 is depicted in FIG. 1. Quantum entropy generator 105 is a entropy source that is trusted by the various computer systems depicted in FIG. 1. A specific implementation of quantum entropy generator 105 is depicted in FIG. 2 and described below. While a quantum entropy generator is depicted in FIG. 5, in alternative embodiments, other entropy generators may also be used. Embodiments thus allow any suitable trusted entropy source to be included.

In the embodiment depicted in FIG. 1, computer systems A 110 and C 130 are directly connected to the quantum entropy generator 105 via links 111 and 131. For example, computer system A 110 may be physically located near the quantum entropy generator 105 and may be connected to the quantum entropy generator 105 by a direct wire. Whether through a directly wired line, or through another fully trusted communication channel, the computer system A 110 can receive entropy from the trusted entropy generator without the entropy being intercepted or compromised. In a similar manner, computer system C 130 may be physically located near the quantum entropy generator 105 and may be connected to the quantum entropy generator 105 by a direct wire, and receive entropy from the trusted entropy generator without the entropy being intercepted or compromised.

Links 111 and 131 enable safe and secure communication of quantum entropy generated by quantum entropy generator 105 to computer systems A 110 and C 130 via secure channels. In certain implementations, the secure channel may be implemented using an insulated RS-232 serial cable. The cable may be positioned 90 degrees orthogonal to any other cable present in the connection environment. The cable may also be positioned no closer to another data cable than the product of the squares of the electromagnetic field permeability of the shielding of each cable to the maximum signaling voltage carried by the cable (e.g., between 3 and 15 volts). In yet other implementations, a fiber optic cable that is shielded from optical interference may be used to communicate entropy information from entropy generator 105 to a computer system that is directly connected to the entropy generator. In other implementations, other cables may be used that cannot be physically tampered with and the signals accrued by the cables cannot be snooped upon or tampered with.

In contrast to computer systems A 110 and C 130, in FIG. 1, the computer systems B 120 and D 140 do not have a direct connection or other pre-established secure communication channel to/with the quantum entropy generator 105. Computer systems B 120 and D 140 may be located in locations that are remote from the location of quantum entropy generator 105, such as in a different geographical location, for example, in a different city, state, or even country. Accordingly, the secure communication links or channels 111 and 131 that can be used to communicate entropy information directly from quantum entropy generator 105 to computer systems A 110 and C 130 are not available for computer systems B 120 and D 140. Computer systems B 120 and D 140 are thus unable to receive entropy from the trusted entropy generator without risk of the entropy being intercepted or compromised.

In the embodiment depicted in FIG. 1, the various computer systems are communicatively coupled to each other via a lattice network with a graph clustering ratio of 1.0, in which each computer system is connected to each other computer system. The configuration depicted in FIG. 1 is not intended to be limiting or restrictive. In alternative embodiments, other connection configurations between the computer systems are possible. In FIG. 1, computer system A 110 is communicatively coupled with computer systems B 120, C 130, and computer system D 140. As described below in further detail, computer system A 110 is able to use the entropy received from quantum entropy generator 105 to establish secure communication channels with computer systems B 120, C 130, and/or D 140 and transmit at least a portion of the entropy information received by computer system A 110 from quantum entropy generator 105 to these other computer systems using the secure communication channels.

In the embodiment depicted in FIG. 1, computer system C 130 is communicatively coupled with computer systems A 110, B 120, and D 140. According to the techniques disclosed in this disclosure, computer system C 120 is able to use the entropy received from quantum entropy generator 105 to establish secure communication channels with computer systems A 110, B 120, and/or D 140, and transmit at least a portion of the entropy information received by computer system C 130 from quantum entropy generator 105 to these other computer systems using the secure communication channels.

In the embodiment depicted in FIG. 1, computer system B 120 is communicatively coupled with multiple computer systems including computer system D 140. Computer system B 120 may use the entropy received from computer systems A 110 or C 130 to establish a secure communication channel with computer system D 140 and transmit at least a portion of the entropy information received by computer system B 120 to computer system D 140 using the secure communication channel. In a similar manner, in FIG. 1, computer system D 140 is communicatively coupled with multiple computer systems including computer system B 120. Computer system D 140 may use the entropy received from computer systems A 110 or C 130 to establish a secure communication channel with computer system B 120 and transmit at least a portion of the entropy information received by computer system D 140 to computer system B 120.

FIG. 2 shows an example of a quantum entropy generator 205, according to certain embodiments. The quantum entropy generator 205 can include a laser 206, a beam splitter 207, a sensor A 250, a sensor B 260, and a sampler 270. Quantum entropy generator 205 may use the various components depicted in FIG. 2 to generate entropy information of high quality.

In certain implementations, laser 206 is a single-photon source, such as a faint laser, that is capable of generating short burst of light. Laser 206 can emit photons toward the beam splitter 207, which is configured to split the photon beam received from laser 206 such that some of the photons are reflected or transmitted to the sensor A 250 and others are reflected or transmitted towards the sensor B 260. For example, this can be achieved by using a 50% reflective mirror as the beam splitter 207. The 50% mirror may be placed at a 45 degrees angle relative to the path of the laser 206 and photons. The two sensors A 250 and B 260 are placed at precise locations that any photon released by laser 206 and split by splitter 207 could exist at. The sampler 270 is capable of reading which sensor (A 250 or B 260) a photon arrived at when observed and generates a string of data based on the information received from the two sensors. For example, the sampler 270 can create a string of 0's and 1's, where a photon when detected by the sensor A 250 is interpreted as a 0, and a photon detected by the sensor B 260 is interpreted as a 1.

For example, laser 206 may transmit a single photon of lights towards splitter 207. Via relativistic quantum electrodynamic reflection by 50% mirror splitter 207, that photon arrives at either sensor A 250 or at sensor B 260 with a probability that 1:1 corresponds with the reflectivity of the coating on the 50% mirror. When a photon is received by either sensor, the sampler 270 adds a bit to the stream of previously generated entropy as follows: (a) when sensor A 250 receives the photon, the sampler 270 appends a bit "1" to the entropy stream; and (b) when sensor B 260 receives the photon, the sampler 270 appends a bit "0" to the entropy stream. For example, if the photons generated by laser 206 are received by sensors A and B in the following sequence "AABABBBABAB", then the entropy stream generated by sampler 270 would be "1101001010". In certain implementations, the entropy generation process is repeated at the maximum Nyquist sampling frequency between the laser 206 and sensor/sampler assembly. This results in a stream of quantum-grade entropy being generated by quantum entropy generator 205. The quantum entropy may then be communicated by quantum entropy generator 205 to one or more computer systems that are directly connected to quantum entropy generator 205 and over secure communication channels.

For each interaction between a photon and the beam splitter 207, the transmission or reflection of that photon is the result of quantum mechanics. As a result, the sequence of photon reflections and transmissions is truly random and the result of quantum entropy. It follows that the sequence of photons detected by the sensor A 250 and sensor B 260 is the result of quantum entropy, and the string of data created by the sampler 270 is the result of quantum entropy. Accordingly, the string of data created by the sampler 270 can be referred to as quantum entropy.

The various inventive techniques described in this disclosure can be used in a distributed cloud environment. In a cloud environment, a cloud service provider (CSP) may provide one or more cloud services to one or more subscribing customers. The term cloud service is generally used to refer to a service that is made available by a CSP to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services. There are several cloud service providers that offer various types of cloud services. There are various different types or models of cloud services including Software-as-a-Service (SaaS), Platform-as-a-Service (PaaS), Infrastructure-as-a-Service (IaaS), and others.

In an IaaS model, the CSP provides infrastructure (referred to as cloud services provider infrastructure or CSPI) that can be used by customers to build their own customizable private networks referred to a virtual cloud networks (VCNs). Customers can deploy one or more customer resources or workloads, such as compute instances (also referred to as hosts), on these VCNs. The compute instances or hosts are hosted by computer systems, which are referred to as host machines. A host can be a virtual machine compute instance or a bare metal compute instance. A virtual machine (VM) compute instance is an independent virtualized machine that runs on a physical bare metal computer system. Virtualization technologies, such as a hypervisor, makes it possible to run multiple virtual machine compute instances on the same host machine. A bare metal compute instance is hosted by a bare metal server or host machine without a hypervisor. When a bare metal compute instance is provisioned, a single customer or tenant maintains control of the physical CPU, memory, and network interfaces of the host machine hosting the bare metal instance and the host machine is not shared with other customers or tenants.

Figure 7:
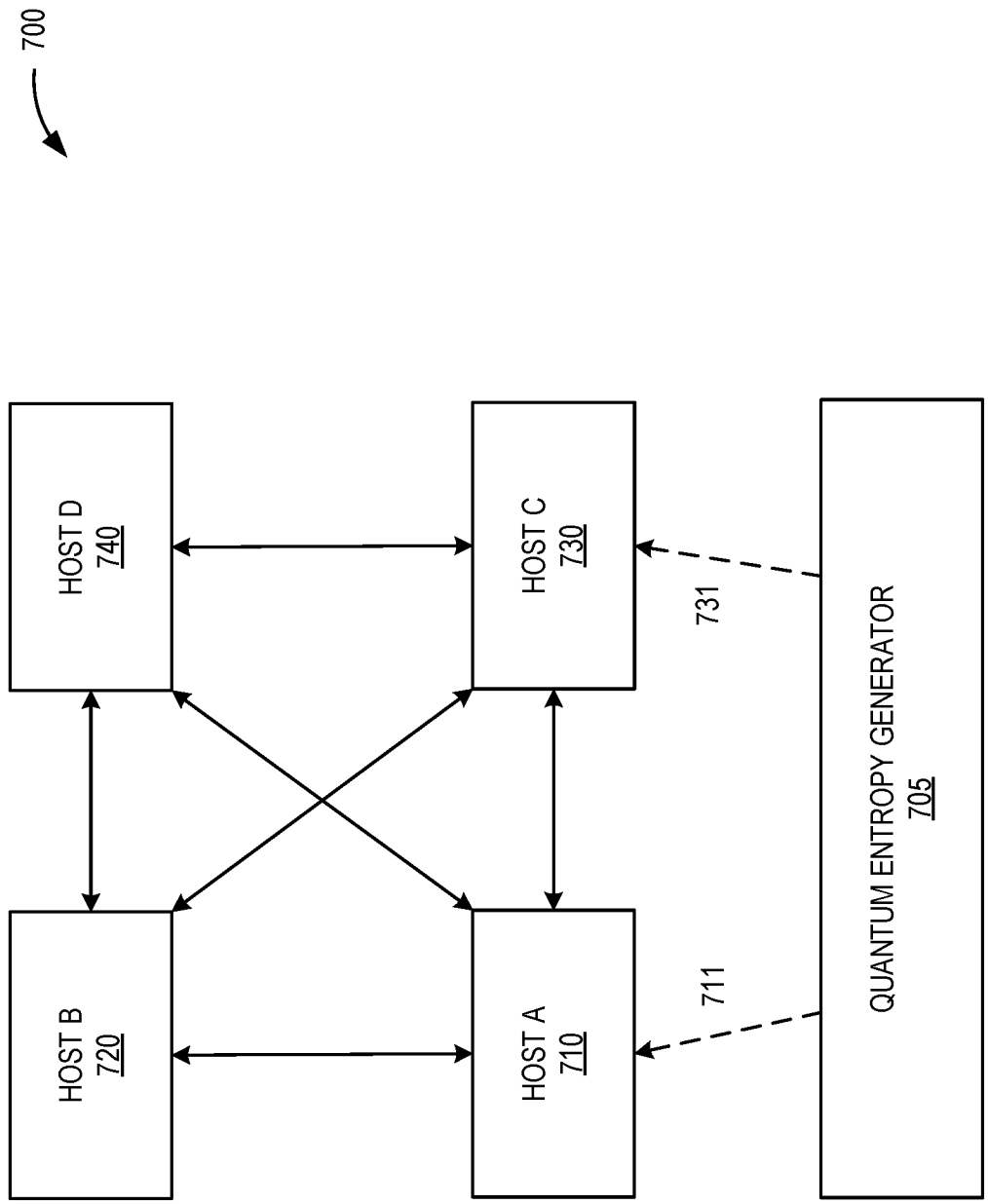
FIG. 7 is a simplified block diagram of a distributed cloud environment, according to some embodiments.

The entropy distribution techniques described in this disclosure can also be used to distribute entropy between compute instances or hosts in a distributed cloud environment. FIG. 7 is a simplified block diagram of a distributed cloud environment 700 according to some embodiments. The environment depicted in FIG. 7 is very similar to the environment depicted in FIG. 1, with the change that FIG. 7 depicts multiple compute instances or hosts instead of computer systems depicted in FIG. 1. The description provided above for the computer systems in FIG. 1 is also applicable to the compute instances depicted in FIG. 7. The distributed cloud environment depicted in FIG. 7 is merely an example and is not intended to unduly limit the scope of claimed embodiments. Many variations, alternatives, and modifications are possible. For example, in some implementations, the distributed environment 700 may have more or fewer components than those shown in FIG. 7, or may have a different configuration or arrangement of hosts and communication lines.

As depicted in FIG. 7, the hosts or compute instances include a host A 710, a host B 720, a host C 730, and a host D 740 communicatively coupled to each other via a lattice network with a graph clustering ratio of 1.0, in which each host is connected to each other host. The configuration depicted in FIG. 7 is not intended to be limiting or restrictive. The hosts depicted in FIG. 7 may be virtual machine compute instances or bare metal compute instances. In the case of virtual machine compute instances, the compute instances may be hosted by different host machines or some may hosted by the same host machine. The hosts in FIG. 7 may belong to one tenant or customer of cloud services or to multiple different tenants or customers of cloud services.

In certain implementations, the ability to receive high quality entropy information may be itself provided as a service to the customers. A customer may subscribe to such a service, and once subscribed, high quality entropy generated by quantum entropy generator 705 is made available to hosts of the subscribing customer using the various distribution techniques described in this disclosure.

Hosts A 710 and C 730 are directly connected to the quantum entropy generator 705 via links 711 and 731. As described above with respect to FIG. 1, links 711 and 731 are like links 111 and 131 and enable entropy generated by quantum entropy generator 705 to be communicated to hosts A 710 and C 730 in a secure manner without the entropy being intercepted or compromised.

In contrast to hosts A 710 and C 730, hosts B 720 and D 740 do not have a direct connection or other pre-established secure communication channel to/with the quantum entropy generator 705. Hosts B 720 and D 740 may be located in locations that are remote from the location of quantum entropy generator 705, such as in a different geographical location, for example, in a different city, state, or even country. Accordingly, the secure communication links or channels 711 and 731 that can be used to communicate entropy information directly from quantum entropy generator 705 to hosts A 710 and C 730 are not available for hosts B 720 and D 740.

In FIG. 7, host A 710 is communicatively coupled with computer instances B 720, C 730, and D 740. As described below in further detail, host A 710 is able to use the entropy received from quantum entropy generator 705 to establish secure communication channels with hosts B 720, C 730, and/or D 740 and transmit at least a portion of the entropy information received by host A 710 from quantum entropy generator 705 to these other hosts using the secure communication channels.

In FIG. 1, host C 730 is communicatively coupled with hosts A 710, B 720, and D 740. According to the techniques disclosed in this disclosure, host C 720 is able to use the entropy received from quantum entropy generator 705 to establish secure communication channels with hosts A 710, B 720, and/or D 740, and transmit at least a portion of the entropy information received by host C 730 from quantum entropy generator 705 to these other hosts using the secure communication channels.

In the embodiment depicted in FIG. 1, host B 720 is communicatively coupled with multiple hosts including host D 740. Host B 720 may use the entropy received from hosts A 710 or C 730 to establish a secure communication channel with host D 740 and transmit at least a portion of the entropy information received by host B 720 to host D 740 using the secure communication channel. In a similar manner, in FIG. 7, host D 740 is communicatively coupled with multiple hosts including host B 720. Host D 740 may use the entropy received from hosts A 710 or C 730 to establish a secure communication channel with host B 720 and transmit at least a portion of the entropy information received by host D 740 to host B 720.

FIGS. 3-8 depict various swim charts and flowcharts depicting various methods for distributing entropy according to certain embodiments. The swimcharts and flowcharts in FIGS. 3-8 and the associated description describe distribution of entropy between hosts, where the hosts may be hosted by one or different host machines. The teachings depicted in FIGS. 3-8 and the accompanying description is also applicable for securely distributing entropy between various host machines or computer systems, such as between the various computer systems depicted in FIG. 1. Additionally, while FIGS. 3-8 and the accompanying description describes distribution of quantum entropy, this is not intended to be limiting. The teachings described herein can also be used to distribute other types of entropy information generated from other trusted sources such as radio-active decay, thermal noise, human interactions with computer interface hardware, and/or airflow detections.

Figure 3:
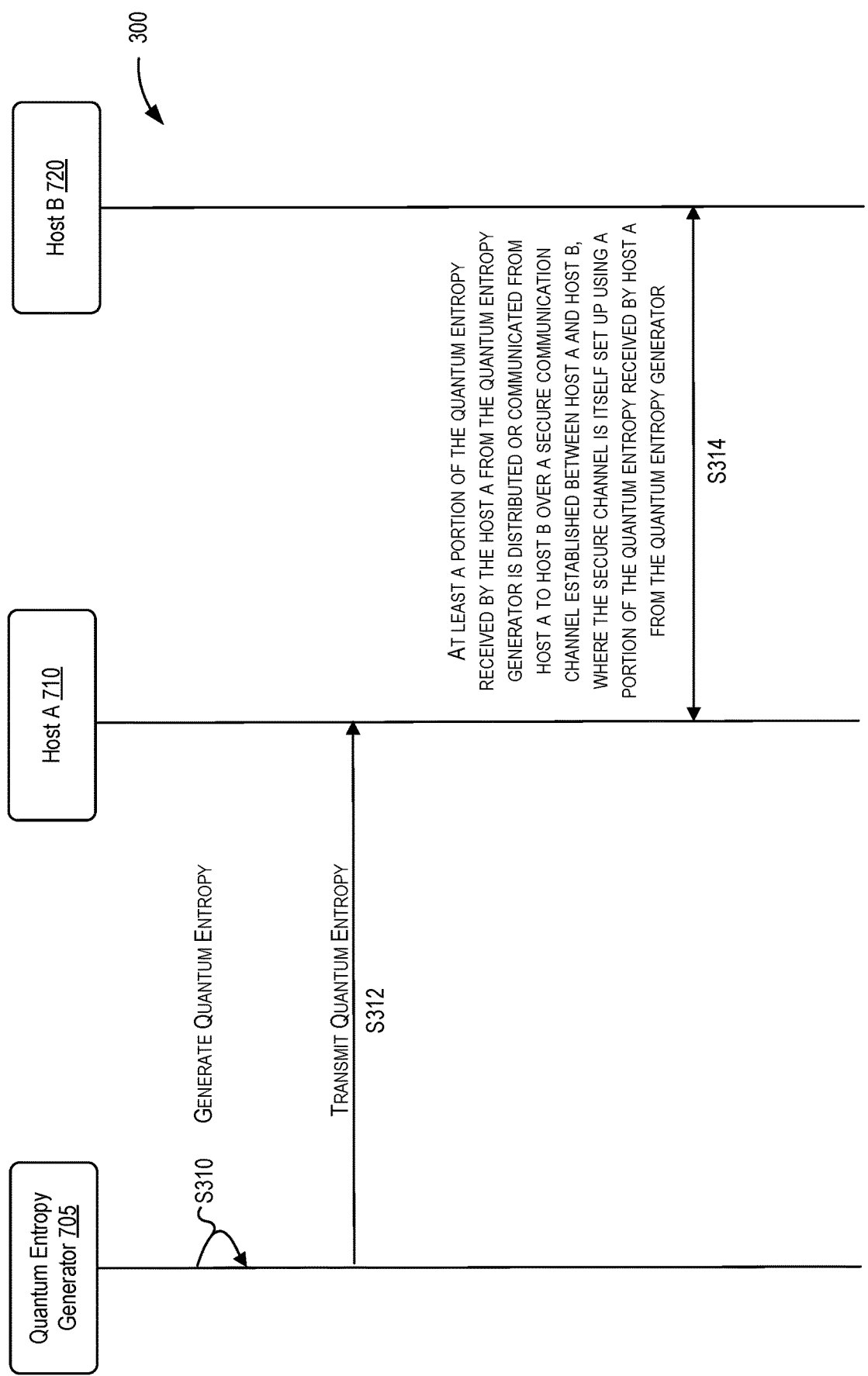
FIG. 3 depicts a simplified swimchart depicting a process for distributing or communicating entropy information generated by a quantum entropy generator to multiple hosts or compute instances according to certain embodiments.

FIG. 3 depicts a simplified swimchart 300 depicting a process for distributing or communicating entropy information generated by a quantum entropy generator 705 to multiple hosts or compute instances according to certain embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel.

FIG. 3 depicts and the accompanying description describes distribution of entropy between the various components depicted in FIG. 7. More specifically, FIG. 3 and the accompanying description describes distribution of quantum entropy from quantum entropy generator 705 to host A 710, which is directly connected to quantum entropy generator 705, and then from host A 710 to host B 720, which is communicatively coupled with host A 710. The teachings in FIG. 3 are applicable to distribution of entropy from a entropy source to computer system that is directly connected to the entropy source, and from the computer system to another computer system that is communicatively coupled to the first computer system. For example, in FIG. 1, host A 710 may use the method to communicate the entropy received from quantum entropy generator 705 to any of computer systems B 720, C 730, or D 740 that are communicatively coupled with host A 710.

As shown in FIG. 3, at S310, the quantum entropy generator 705 (or another suitable trusted source of entropy) can generate quantum entropy. In some embodiments, the quantum entropy generator 705 can generate a stream of quantum entropy that is then available for distribution to one or more connected computer systems.

At S312, the quantum entropy generator 705 can transmit the quantum entropy generated at S310 to the host A 710 that is directly connected to the quantum entropy generator 705. In certain embodiments, a host machine hosting host A 710 may be directly connected to the quantum entropy generator 705. Any suitable amount of quantum entropy generated by quantum entropy generator 705 can be transmitted. For example, 128 bits, 256 bits, 512 bits, 1024 bits, 2048 bits, or any other suitable amount of quantum entropy can be transmitted to the host A 710. In certain implementations, the quantum entropy may be transmitted in the form of a stream of quantum entropy.

In S312, the entropy information is transmitted from quantum entropy generator 705 to the host A 710 over a trusted connection. For example, the entropy information may be communicated over a direct local wired connection between the quantum entropy generator 705 and the host A 710 (or between quantum entropy generator 705 and a host machine hosting host A 710) that is not connected to the Internet and/or other networks. The cable used for the wired connection may also be shielded from external interference or tampering or snooping. Additionally or alternatively, the quantum entropy can be transmitted in encrypted form. For example, the quantum entropy generator 705 can encrypt the quantum entropy generated in S310, and then transmit the encrypted quantum entropy to the host A 710 in S312. The host B 720 can then decrypt the encrypted quantum entropy upon reception.

At S314, at least a portion of the quantum entropy received by the host A 710 from quantum entropy generator 705 is distributed or communicated from host A 710 to host B 720 over a secure communication channel established between host A 710 and host B 720, where the secure channel itself is set up using a portion of the quantum entropy received by host A 710 from quantum entropy generator 705.

In certain implementations, the secure communication channel is established using cryptographic keys that have themselves been generated using portions of the quantum entropy received by host A 710 from the quantum entropy generator 705. For example, the host A 710 can utilize a first portion of the quantum entropy received in step S312 to generate one or more cryptographic keys for use in establishing a secure communication channel with the host B 720. Then, the host A 710 can transmit a second portion of the quantum entropy received in step S312 to the host B 720 using the secure communication channel. As a result, the host B 720 can receive quantum entropy from the quantum entropy generator 705, even when there is no direct connection or otherwise pre-existing secure communication channel between the quantum entropy generator 705 and the host B 720. The host B 720 can then utilize the second portion of the quantum entropy for use in refreshing and/or further securing the communication channel between host B 720 and host A 710. In some embodiments, the host B 720 can utilize the second portion of the quantum entropy for an application operation, for use in establishing one or more additional communication channels with other computer systems, or for any other suitable purpose.

Figure 4:
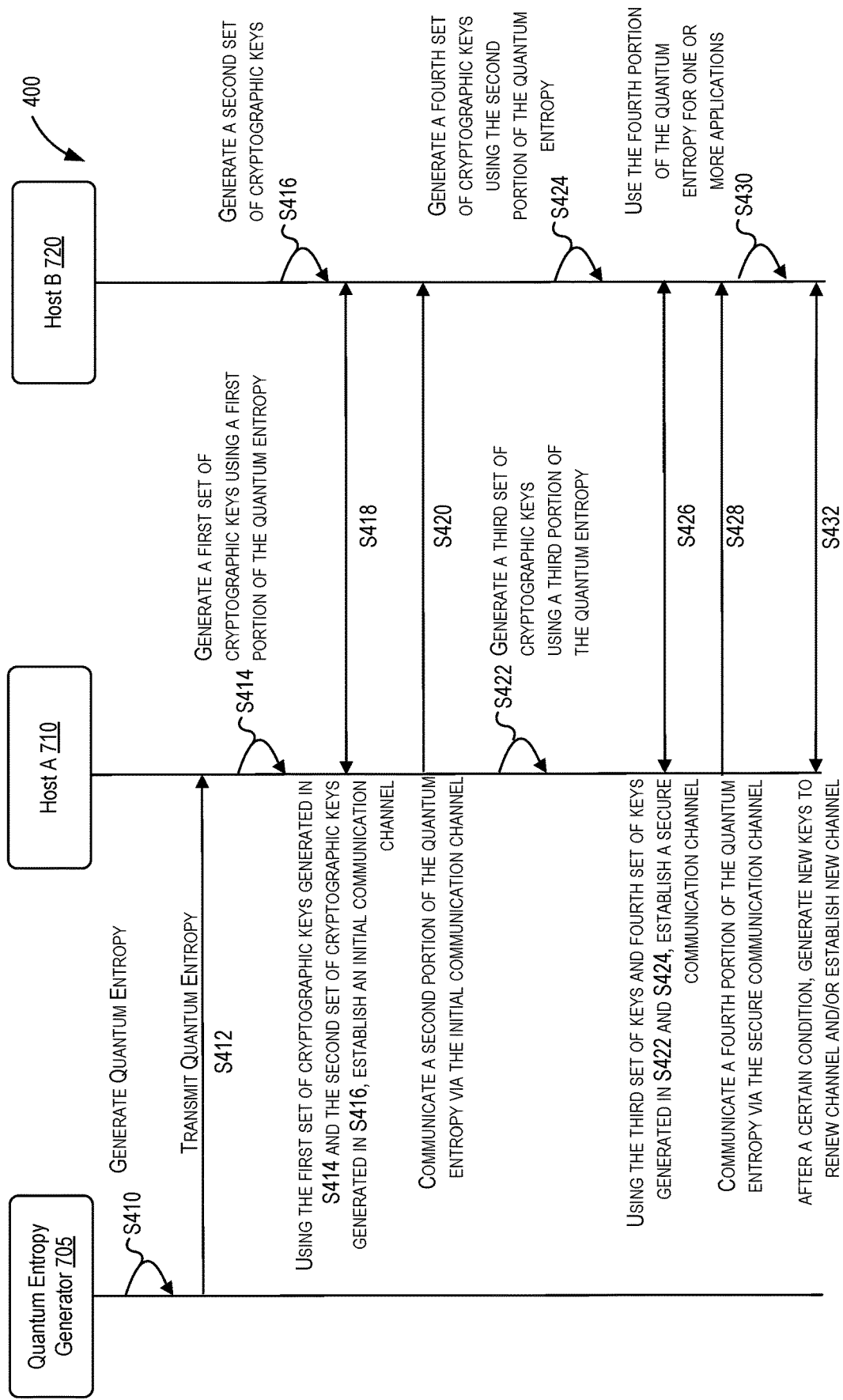
FIG. 4 depicts a simplified swimchart depicting another process distributing or communicating entropy information generated by a quantum entropy generator to multiple hosts or compute instances according to certain embodiments.

An example of processing performed in step S314 in FIG. 3 is depicted in FIG. 4 and described below, according to some embodiments. FIG. 4 depicts a simplified swimchart 400 depicting another process distributing or communicating entropy information generated by a quantum entropy generator 705 to multiple hosts or compute instances according to certain embodiments. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 4 may be performed by the quantum entropy generator 705, the host A 710, and/or the host B 720.

As shown in FIG. 4, at S410, the quantum entropy generator 705 (or another suitable trusted source of entropy) can generate quantum entropy. In some embodiments, the quantum entropy generator 705 can generate a stream of quantum entropy that is then available for distribution to one or more connected computer systems.

At S412, the quantum entropy generator 705 can transmit the quantum entropy generated at S410 to the host A 710 that is directly connected to the quantum entropy generator 705. In certain embodiments, the host machine hosting host A 710 may be directly connected to the quantum entropy generator 705. Any suitable amount of quantum entropy generated by quantum entropy generator 705 can be transmitted. For example, 128 bits, 256 bits, 512 bits, 1024 bits, 2048 bits, or any other suitable amount of quantum entropy can be transmitted to the host A 710. In certain implementations, the quantum entropy may be transmitted in the form of a stream of quantum entropy.

In S412, the entropy information is transmitted from quantum entropy generator 705 to the host A 710 over a trusted connection. For example, the entropy information may be communicated over a direct local wired connection between the quantum entropy generator 705 and the host A 710 (or between quantum entropy generator 705 and a host machine hosting host A 710) that is not connected to the Internet and/or other networks. The cable used for the wired connection may also be shielded from external interference or tampering or snooping. Additionally or alternatively, the quantum entropy can be transmitted in encrypted form. For example, the quantum entropy generator 705 can encrypt the quantum entropy generated in S310, and then transmit the encrypted quantum entropy to the host A 710 in S412. The host B 720 can then decrypt the encrypted quantum entropy upon reception.

The processing in S414, S416, S418, S420, S422, S424, S426, and S428 is performed to establish a secure communication channel between host A 710 and host B 720 and then using this secure channel to distribute or communicate a portion of the quantum entropy received by host A 710 from the quantum entropy generator 705 to host B 720. The communication channel that is established between host A 710 and host B 720 is such that the entropy that is communicated using this channel cannot be snooped upon, tampered with, or intercepted. The quantum entropy itself may be utilized as secret information during, for example, generation of cryptographic keys for setting up the communication channel between host A 710 and host B 720.

The processing in S414, S416, and S418 is performed to establish an initial communication channel between host A 710 and host B 720. At S414, the host A 710 can generate a first set of one or more cryptographic keys using a first portion of the quantum entropy received by host A 710 from the quantum entropy generator 705. For example, the host A 710 can generate a first public key for use in an initial key exchange with the host B 720 for setting up the initial communication channel. The first portion of the quantum entropy can have any suitable size, such as 256 bits or 512 bits of quantum entropy.

At S416, the host B 720 can generate a second set of one or more cryptographic keys for use in setting up the initial communication channel with host A 710. For example, the host B 720 can generate a second public key for use in the initial key exchange with the host A 710. Since the host B 720 does not yet have access to quantum entropy generated by the quantum entropy generator 705, the host B 720 may use some other entropy information in S416 for the key generation process, such as a data string generated by a software-based pseudo-random number generator or another type of potentially untrusted entropy source. This entropy generated by these sources may not be as secure or trusted as the quantum entropy generated by the quantum entropy generator 705.

At S418, using the first set of cryptographic keys generated in S414 by the host A 710 and the second set of cryptographic keys generated by host B 720 in S416, an initial communication channel is established between host A 710 and host B 720. As part of the processing in S418, the host A 710 and the host B 720 can perform an initial key exchange to create an initial shared key (e.g., a symmetric key). This can involve exchanging information based on the first set of cryptographic keys generated by the host A 710 in S414, as well information based on the second set of cryptographic keys generated by the host B 720 in S416. In some embodiments, the information exchange can include an Elliptic-curve Diffie Hellman key agreement protocol.

As described above, the initial communication channel is established using the first set of cryptographic keys that are generated by host A 710 using a portion of the quantum entropy received by host A 710 from the quantum entropy generator 705, and using the second set of cryptographic keys generated by host B 720 using entropy that is not from the quantum entropy generator 705 and thus is not as trustworthy as the entropy information from the quantum entropy generator 705. The initial communication channel is thus a connection of asymmetric entropy-derived cryptographic strength. This initial communication channel can be sufficiently trusted for transmitting at least some secret information to the host B 720 without the secret information being intercepted or compromised. Accordingly, the initial communication channel is used for transmitting a portion of the quantum entropy received by host A 710 from the quantum entropy generator 705 to host B 720 as described below for S420.

At S420, the host A 710 communicates a portion (second portion) of the quantum entropy received by host A 710 from the quantum entropy generator 705 to host B 720 via the initial communication channel. In certain implementations, since the initial communication channel is a connection of asymmetric entropy-derived cryptographic strength where only one set of the cryptographic keys used to set up the communication channel are generated using entropy information generated by the quantum entropy generator 705, host A 710 may take precautions for communicating the entropy information in S420. For example, the entropy information may be communicated from host A 710 to host B 720 over the initial communication channel in encrypted form. Host A 710 may first encrypt the portion (second portion) of the quantum entropy to be communicated to host B 720 and then communicate the encrypted entropy information to host B 720. In certain implementations, the entropy information may be encrypted using an initial symmetric key created at step S416. Host B 720 can decrypt the second portion of the quantum entropy upon receipt using the initial symmetric key. The second portion of the quantum entropy can have any suitable size, such as 256 bits or 512 bits of quantum entropy.

After S420, both host A 710 and host B 720 have access to entropy information generated by the quantum entropy generator 705. The host A 710 previously received this information in S412, while host B 720 receives the entropy information in S420. Since both sides have the trustworthy entropy information generated by the quantum entropy generator 705, a symmetric entropy-derived cryptographic strength connection can now be set up between host A 710 and host B 720. This is described below with respect to steps S422, S424, and S426.

At S422, the host A 710 can generate a third set of one or more cryptographic keys using a portion (third portion) of the quantum entropy received by host A 710 from the quantum entropy generator 705 in S412. For example, the host A 710 can generate a third public key for use in a second key exchange with the host B 720 for establishment of the secure channel. The third portion of the quantum entropy can have any suitable size, such as 256 bits or 512 bits of quantum entropy.

At S424, which can take place at the same time as step S422, the host B 720 can generate a fourth set of one or more cryptographic keys using a portion of the quantum entropy generated by the quantum entropy generator 705 and received by host B 720 in S420. For example, the host B 720 can generate a fourth public key for use in a second key exchange with the host A 710 for establishment of the secure communication channel. The host B 720 can utilize some or all of the quantum entropy received by host B 720 in S420 when generating the fourth set of cryptographic keys. For example, if the portion of the quantum entropy received host B 720 in S420 has a size of 512 bits, then host B 720 may utilize the entire 512 bits or a smaller size of entropy information for the generation of fourth set of one or more public keys.

At S426, a secure communication channel is set up between host A 710 and host B 720 using the third set of cryptographic keys generated by host A 710 in S422 and the fourth set of cryptographic keys generated by host B 720 in S424. In some embodiments, the amount of quantum entropy generator-generated entropy information communicated from host A 710 to host B 720 over the initial semi-secure channel in S420 is just sufficient to facilitate the secure communication channel to be set up between host A 710 and host B 720. For example, the amount of entropy information communicated in S420 may just be sufficient to enable host B 720 to generate the fourth set of cryptographic keys that are used in the establishment of the secure communication channel in S426. As part of the processing in S426, the host A 710 and the host B 720 can perform a second key exchange to create a second shared key (e.g., a symmetric key). This can involve exchanging the third set of cryptographic keys generated in S422, as well the fourth set of cryptographic keys generated in S424. In some embodiments, this can include an Elliptic-curve Diffie Hellman exchange.

The communication channel established in S426 is a connection of symmetric entropy-derived cryptographic strength since both sets of cryptographic keys that are used to set up the communication channel are generated using entropy information generated by the quantum entropy generator 705. The communication channel established in S426 is thus considered fully secure. This secure communication channel is then used by host A 710 to transmit further portions of the quantum entropy information received by host A 710 from quantum entropy generator 705 to host B 720. The communication channel can also be used for other purposes, such as to exchange one or more messages between host A 710 and host B 720.

At S428, the host A 710 can communicate additional portions (e.g., fourth) of the quantum entropy generator-generated quantum entropy to host B 720 via the secure communication channel established in S426. In certain implementations, the entropy information may be communicated as a stream of information. A fourth portion of the quantum entropy can have any suitable size, such as 256 bits or 512 bits of quantum entropy.

At S430, the host B 720 can utilize the fourth portion of the quantum entropy received from host A 710 via the secure communication channel in S428. For example, the host B 720 can use the fourth portion of the quantum entropy for the operations of one or more applications.

In certain implementations, in order to maintain the security of the communication channel established in S426, the cryptographic materials (e.g., cryptographic keys) associated with that connections are themselves regenerated to maintain the secure communication channel. For example, as shown in FIG. 4, at S432, after a certain condition is met, the host A 710 and the host B 720 may generate new cryptographic keys that are used to renew the secure communication channel and/or establish a new secure communication channel, where the new cryptographic keys are also generated using portions of the quantum entropy information accessible to host A 710 and host B 720. This may be repeated each time that the regeneration condition is met or occurs. This is sometime referred to as cryptographic keys rotation. Since the cryptographic keys are valid for only a certain period of time before they have to be regenerated, the cryptographic keys are sometimes referred to as ephemeral cryptographic keys.

In one embodiment, both host A 710 and host B 720 may generate new sets of one or more cryptographic keys using quantum entropy available to the hosts. For host A 710, entropy information used for generating the ephemeral cryptographic keys is received from the quantum entropy generator 705 via the connection between the quantum entropy generator 705 and host A 710. In certain implementations, the quantum entropy generator 705 may be configured to continually send a stream of quantum entropy information to host A 710. For host B 720, the quantum entropy that is used to generate the ephemeral cryptographic keys may have been received by host B 720 from host A 710 via the secure communication channel established in S426.

Various different conditions may trigger the regeneration of the cryptographic materials (e.g., cryptographic keys) in S432. In certain implementations, the triggering condition may be time based. For example, a preconfigured time period may be configured for the connection after which regeneration of the cryptographic keys is needed to maintain the channel. This preconfigured time period may be, for example, a certain number of seconds, a certain number of minutes, a certain number of hours, and the like. For example, after 30 seconds, 1 minute, 5 minutes, 10 minutes, 30 minutes, etc.

In some other embodiments, the triggering condition may be based upon a preconfigured number of packets or messages exchanged between hosts A 710 and B 720. For example, the regeneration of cryptographic keys may be triggered after 1 packet, 2 packets, 5 packets, 10 packets, 20 packets, or in general after "N" packets. Here, "N" varies with the level of risk exposure tolerance a customer of the entropy has. A higher value of N corresponds to less ephemeral keys and a higher risk exposure to potential entropy tampering. For the lowest possible risk tolerance, the value of N may be set to one. This makes the cryptographic keys highly ephemeral. The cryptographic keys rotation rate can be set based upon the level of risk exposure tolerance desired by a customer of the entropy. The clustering graph network shown in FIG. 1 or 7 represents the highest possible rate of entropy consumption that would be needed to maintain strong ephemeral keys between all connections between all hosts in a network because the product of the key rotation rate with the graph clustering coefficient of the compute network determines the rate at which entropy itself is consumed in the process of distributing entropy to the hosts. Due to rapid key rotation, the level of trust in a connection increases logarithmically with the duration of connections between hosts in the network, multiplied by the inverse of "N". This connection duration is expressed an N above, or the number of packets exchanged between two hosts before those two hosts regenerate their ephemeral keys.

As indicated above, the particular sequence or order of steps depicted in FIG. 4 is not intended to be limiting. In certain alternative embodiments, the steps may be performed in some different order or some steps may also be performed in parallel. For example, while steps S420, S422, and S424 are shown as occurring in a particular order in swimchart 400 in FIG. 4, this is not intended to be limiting. In alternative embodiments, these can occur in any order. In yet other embodiments, the processing in S420, S422, and S424 may overlap or may be performed in parallel.

In the embodiment depicted in FIG. 4 and described, quantum entropy information generated by quantum entropy generator 705 is transmitted to host A 710 in S412. In certain implementations, this transmission of entropy information from an entropy source to a host that is directly connected to the entropy source may occur as a one-time event. In other implementations, the transmission of quantum entropy information from an entropy source to a host directly connected to the entropy source may occur periodically, wherein after each period new entropy information generated by the entropy source is communicated to the connected host. In yet other embodiments, the transmission of quantum entropy information from an entropy source to a host directly connected to the entropy source may occur in a continuous manner as a stream of entropy information that is generated by the entropy source and communicated to the connected host. In some other embodiment, the entropy information may be communicated from a entropy source to a host when the host request the information. For example, the host may send a request to the entropy source requesting entropy information and the entropy source may then respond to the request by sending the requested entropy information generated by the entropy source to the requesting host. Other transmission mechanisms may be used in other embodiments.

The transmission of entropy information from one host to another host (e.g., from host A 710 to host B 720) may also occur according to various different modes. In one embodiment, a first host may communicate the entropy information to a second host as a one-time event over a secure communication channel established between the two hosts. In other implementations, the transmission of quantum entropy information from the first host to the second host may occur periodically over the secure communication channel, wherein after each period new entropy information is communicated from the first host to the second host, wherein the new entropy information may be part of entropy information received by the first host from a entropy source or from another host. In yet other embodiments, the transmission of quantum entropy information from the first host to the second host may occur in a continuous manner as a stream of entropy information over the secure communication channel established between the hosts. In some other embodiment, the entropy information may be communicated from the first host to the second host when the second host requests the information. For example, the second host may send a request to the first host requesting entropy information and the first host may then respond to the request by sending the requested entropy information to the requesting second host. Other transmission mechanisms may be used in other embodiments.

The process illustrated in FIG. 4 demonstrates how entropy generated by an entropy source can be received by a host (e.g., host A 710) that is directly connected to the entropy source (e.g., quantum entropy generator 705), and further, how the host receiving the entropy information can distribute portions of the entropy to other one or more hosts that are communicatively coupled with the first host. The other hosts may or may not be connected to the entropy source. A host receiving the entropy information can further distribute portions of the received entropy information to other hosts communicatively coupled with that host. In this manner, the entropy information generated by an entropy source can be securely distributed to multiple hosts in a distributed networked environment. The entropy can be forwarded to hosts that are several degrees of separation from the entropy source (e.g., from quantum entropy generator 705) For example, the host B 720 can receive quantum entropy from the host A 710, and then the host B 720 can forward a portion of the received quantum entropy to the host D 740, and host D 740 can forward it to other connected hosts, and so on.

In the manner described above, the hosts in a network (e.g., in a lattice network) can get access to entropy information, such as quantum entropy, generated by a trusted entropy generation source, even if the hosts are not directly connected to the entropy source. Due to the high quality and trust placed in the quantum entropy information received by a host, the received entropy information can be used for various operations where high trust is needed. For example, the quantum entropy can be used by a host to generate trusted cryptographic keys. These cryptographic keys can be used for different applications, such as, for example, for establishing trusted communication channels between the hosts. The present disclosure describes a method for distribution of quantum entropy generated by a quantum entropy source through an ephemerally keyed lattice cryptographic network to a fleet of hosts (e.g., virtual machine compute instances and/or bare metal compute instances), where a host receiving the quantum entropy may not be connected to the entropy source or may not have a local source of trusted entropy information.

FIG. 5 depicts a simplified flowchart 500 depicting steps performed by a first host during a process for distributing or communicating entropy information generated by a quantum entropy generator 705 to multiple hosts or compute instances, according to certain embodiments. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 5 may be performed by the host A 710. In some embodiments, the first host described below with respect to FIG. 5 can represent the host A 710, and the second host described below with respect to FIG. 5 can represent the host B 720.

The quantum entropy generator 705 (or another suitable trusted source of entropy) can generate quantum entropy. In some embodiments, the quantum entropy generator 705 can generate a stream of quantum entropy that is then available for distribution to one or more connected computer systems.

At S502, the first host receives quantum entropy from the quantum entropy generator 705. The first host may be directly connected to the quantum entropy generator 705. In certain embodiments, the host machine hosting the first host may be directly connected to the quantum entropy generator 705. Any suitable amount of quantum entropy generated by the quantum entropy generator 705 can be received. For example, 128 bits, 256 bits, 512 bits, 1024 bits, 2048 bits, or any other suitable amount of quantum entropy can be transmitted by the quantum entropy generator 705 and received by the first host. In certain implementations, the quantum entropy may be transmitted in the form of a stream of quantum entropy.

In S502, the entropy information is transmitted from quantum entropy generator 705 to the first host over a trusted connection. For example, the entropy information may be communicated over a direct local wired connection between the quantum entropy generator 705 and the first host (or between quantum entropy generator 705 and a host machine hosting the first host) that is not connected to the Internet and/or other networks. The cable used for the wired connection may also be shielded from external interference or tampering or snooping. Additionally or alternatively, the quantum entropy can be transmitted in encrypted form.

At S503, the first host sends a portion of the quantum entropy received by the first host in step S502 to a second host using a secure communication channel that is established using some of the quantum entropy. For example, first host can utilize a first portion of the quantum entropy received at step S502 to establish a secure communication channel with the second host. Then, using that secure communication channel, the first host can send a second portion of the quantum entropy received at step S502 (or quantum entropy received at a later time) to the second host. The communication channel that is established between the first host and the second host is such that the entropy that is communicated using this channel cannot be snooped upon, tampered with, or intercepted. The quantum entropy itself may be utilized as secret information during, for example, generation of cryptographic keys for setting up the communication channel between the first host and the second host.

The processing of S503 can include the execution of the following substeps S504-S514.

The processing in S504 and S506 is performed to establish an initial communication channel between the first host and the second host. At S504, the first host can generate a first set of one or more cryptographic keys using a first portion of the quantum entropy received by the first host from the quantum entropy generator 705. For example, the first host can generate a first public key for use in an initial key exchange with the second host for setting up the initial communication channel. The first portion of the quantum entropy can have any suitable size, such as 256 bits or 512 bits of quantum entropy.

Additionally, at the same time or a similar time, the second host can generate a second set of one or more cryptographic keys for use in setting up the initial communication channel with the first host. For example, the second host can generate a second public key for use in the initial key exchange with the first host. Since the second host does not yet have access to quantum entropy generated by the quantum entropy generator 705, the second host may use some other entropy information for the key generation process, such as a data string generated by a software-based pseudo-random number generator or another type of potentially untrusted entropy source. This entropy generated by these sources may not be as secure or trusted as the quantum entropy generated by the quantum entropy generator 705.

At S506, the first host can use the first set of one or more cryptographic keys generated in S504 by the first host and the second set of cryptographic keys generated by the second host to establish an initial communication channel with the second host. As part of the processing in S506, the first host and the second host can perform an initial key exchange to create an initial shared key (e.g., a symmetric key). This can involve exchanging information based on the first set of cryptographic keys generated by the first host in S504 as well information based on the second set of cryptographic keys generated by the second host. In some embodiments, the information exchange can include an Elliptic-curve Diffie Hellman key agreement protocol.

As described above, the initial communication channel is established using the first set of cryptographic keys that are generated by the first host using a portion of the quantum entropy received by the first host from the quantum entropy generator 705, and using the second set of cryptographic keys generated by the second host using entropy that is not from the quantum entropy generator 705 and thus is not as trustworthy as the entropy information from the quantum entropy generator 705. The initial communication channel is thus a connection of asymmetric entropy-derived cryptographic strength. This initial communication channel can be sufficiently trusted for transmitting at least some secret information to the second host without the secret information being intercepted or compromised. Accordingly, the initial communication channel is used for transmitting a portion of the quantum entropy received by the first host from the quantum entropy generator 705 to the second host as described below for S508.

At S508, the first host communicates a portion (e.g., a second portion) of the quantum entropy received by the first host from the quantum entropy generator 705 to the second host via the initial communication channel. In certain implementations, since the initial communication channel is a connection of asymmetric entropy-derived cryptographic strength where only one set of the cryptographic keys used to set up the communication channel are generated using entropy information generated by the quantum entropy generator 705, the first host may take precautions for communicating the entropy information in S508. For example, the entropy information may be communicated from the first host to the second host over the initial communication channel in encrypted form. The first host may first encrypt the portion (second portion) of the quantum entropy to be communicated to the second host and then communicate the encrypted entropy information to the second host. In certain implementations, the entropy information may be encrypted using an initial symmetric key created at step S506. The second host can decrypt the second portion of the quantum entropy upon receipt using the initial symmetric key.

The second portion of the quantum entropy can have any suitable size, such as 256 bits or 512 bits of quantum entropy. In some embodiments, the second portion of the quantum entropy can be a part of the quantum entropy received at step S502. In other embodiments, the second portion of the quantum entropy can received from the quantum entropy generator immediately before performing step S508.

After S508, both the first host and the second host have access to entropy information generated by the quantum entropy generator 705. The first host previously received this information in S502 (and can receive additional entropy information at this time), while the second host receives the entropy information in S508. Since both sides have the trustworthy entropy information generated by the quantum entropy generator 705, a symmetric entropy-derived cryptographic strength connection can now be set up between the first host and the second host. This is described below with respect to steps S510 and S512.

At S510, the first host can generate a third set of one or more cryptographic keys using a portion (e.g., third portion) of the quantum entropy received by the first host from the quantum entropy generator 705. For example, the first host can generate a third public key for use in a second key exchange with the second host for establishment of the secure channel. The third portion of the quantum entropy can have any suitable size, such as 256 bits or 512 bits of quantum entropy.

Additionally, at the same time or a similar time, the second host can generate a fourth set of one or more cryptographic keys using a portion of the quantum entropy generated by the quantum entropy generator 705 and received by the second host. For example, the second host can generate a fourth public key for use in a second key exchange with the first host for establishment of the secure communication channel. The second host can utilize some or all of the quantum entropy received by the second host when generating the fourth set of cryptographic keys. For example, if the portion of the quantum entropy received the second host has a size of 512 bits, then the second host may utilize the entire 512 bits or a smaller size of entropy information for the generation of fourth set of one or more public keys.

At S512, the first host can use the third set one or more cryptographic keys generated by the first host in step S510 and the fourth set of one or more cryptographic keys generated by the second host to establish a secure communication channel between the first host and the second host. In some embodiments, the amount of quantum entropy generator-generated entropy information communicated from the first host to the second host over the initial semi-secure channel in S508 is just sufficient to facilitate the secure communication channel to be set up between the first host and the second host. For example, the amount of entropy information communicated in S508 may just be sufficient to enable the second host to generate the fourth set of cryptographic keys that are used in the establishment of the secure communication channel in S512. As part of the processing in S512, the first host and the second host can perform a second key exchange to create a second shared key (e.g., a symmetric key). This can involve exchanging the third set of cryptographic keys generated in S510, as well the fourth set of cryptographic keys generated by the second host. In some embodiments, this can include an Elliptic-curve Diffie Hellman exchange.

The communication channel established in S512 is a connection of symmetric entropy-derived cryptographic strength since both sets of cryptographic keys that are used to set up the communication channel are generated using entropy information generated by the quantum entropy generator 705. The communication channel established in S512 is thus considered fully secure. This secure communication channel is then used by the first host to transmit further portions of the quantum entropy information received by the first host from quantum entropy generator 705 to the second host. The communication channel can also be used for other purposes, such as to exchange one or more messages between the first host and the second host.

At S514, the first host can communicate additional portions (e.g., a fourth portion) of the quantum entropy generator-generated quantum entropy to the second host via the secure communication channel established in S512. For example, the first host can encrypt a fourth portion of the quantum entropy using the second symmetric key created at step S512, the first host can transmit the encrypted fourth portion of the quantum entropy to the second host, and the second host can decrypt the fourth portion of the quantum entropy using the second symmetric key. In certain implementations, the entropy information may be communicated as a stream of information. A fourth portion of the quantum entropy can have any suitable size, such as 256 bits or 512 bits of quantum entropy.

The second host can utilize the fourth portion of the quantum entropy received from the first host via the secure communication channel in S514. For example, the second host can use the fourth portion of the quantum entropy for the operations of one or more applications.

In certain implementations, in order to maintain the security of the communication channel established in S512, the cryptographic materials (e.g., cryptographic keys) associated with that connections are themselves regenerated to maintain the secure communication channel. For example, as shown in FIG. 5, at S516, after a certain condition is met, the first host and the second host may generate new cryptographic keys that are used to renew the secure communication channel and/or establish a new secure communication channel, where the new cryptographic keys are also generated using portions of the quantum entropy information accessible to the first host and the second host. This may be repeated each time that the regeneration condition is met or occurs. This is sometime referred to as cryptographic keys rotation. Since the cryptographic keys are valid for only a certain period of time before they have to be regenerated, the cryptographic keys are sometimes referred to as ephemeral cryptographic keys. As mentioned above, the first host and the second host can exchange keys to generate a shared key (e.g., symmetric key) through a Diffie-Hellman exchange (e.g., an Elliptic-curve Diffie-Hellman exchange). Since the exchange process can happen repeatedly to produce ephemeral cryptographic keys, the exchange can be referred to as an ephemeral Diffie-Hellman exchange or an ephemeral Elliptic-curve Diffie-Hellman exchange.

In one embodiment, both the first host and the second host may generate new sets of one or more cryptographic keys using quantum entropy available to the hosts. For the first host, entropy information used for generating the ephemeral cryptographic keys is received from the quantum entropy generator 705 via the connection between the quantum entropy generator 705 and the first host. In certain implementations, the quantum entropy generator 705 may be configured to continually send a stream of quantum entropy information to the first host. For the second host, the quantum entropy that is used to generate the ephemeral cryptographic keys may have been received by the second host from the first host via the secure communication channel established in S514.

Various different conditions may trigger the regeneration of the cryptographic materials (e.g., cryptographic keys) in S516. In certain implementations, the triggering condition may be time based. For example, a preconfigured time period may be configured for the connection after which regeneration of the cryptographic keys is needed to maintain the channel. This preconfigured time period may be, for example, a certain number of seconds, a certain number of minutes, a certain number of hours, and the like. For example, after 30 seconds, 1 minute, 5 minutes, 10 minutes, 30 minutes, etc.

In some other embodiments, the triggering condition may be based upon a preconfigured number of packets or messages exchanged between the first host and the second host. For example, the regeneration of cryptographic keys may be triggered after 1 packet, 2 packets, 5 packets, 10 packets, 20 packets, or in general after "N" packets. Here, "N" varies with the level of risk exposure tolerance a customer of the entropy has. A higher value of N corresponds to less ephemeral keys and a higher risk exposure to potential entropy tampering. For the lowest possible risk tolerance, the value of N may be set to one. This makes the cryptographic keys highly ephemeral. The cryptographic keys rotation rate can be set based upon the level of risk exposure tolerance desired by a customer of the entropy. The clustering graph network shown in FIG. 1 or 7 represents the highest possible rate of entropy consumption that would be needed to maintain strong ephemeral keys between all connections between all hosts in a network because the product of the key rotation rate with the graph clustering coefficient of the compute network determines the rate at which entropy itself is consumed in the process of distributing entropy to the hosts. Due to rapid key rotation, the level of trust in a connection increases logarithmically with the duration of connections between hosts in the network, multiplied by the inverse of "N". This connection duration is expressed an N above, or the number of packets exchanged between two hosts before those two hosts regenerate their ephemeral keys.

As indicated above, the particular sequence or order of steps depicted in FIG. 5 is not intended to be limiting. In certain alternative embodiments, the steps may be performed in some different order or some steps may also be performed in parallel.

In the embodiment depicted in FIG. 5 and described, quantum entropy information generated by quantum entropy generator 705 is transmitted to the first host in S502. In certain implementations, this transmission of entropy information from an entropy source to a host that is directly connected to the entropy source may occur as a one-time event. In other implementations, the transmission of quantum entropy information from an entropy source to a host directly connected to the entropy source may occur periodically, wherein after each period new entropy information generated by the entropy source is communicated to the connected host. In yet other embodiments, the transmission of quantum entropy information from an entropy source to a host directly connected to the entropy source may occur in a continuous manner as a stream of entropy information that is generated by the entropy source and communicated to the connected host. In some other embodiment, the entropy information may be communicated from a entropy source to a host when the host request the information. For example, the host may send a request to the entropy source requesting entropy information and the entropy source may then respond to the request by sending the requested entropy information generated by the entropy source to the requesting host. Other transmission mechanisms may be used in other embodiments.

The transmission of entropy information from one host to another host (e.g., from the first host to the second host) may also occur according to various different modes. In one embodiment, a first host may communicate the entropy information to a second host as a one-time event over a secure communication channel established between the two hosts. In other implementations, the transmission of quantum entropy information from the first host to the second host may occur periodically over the secure communication channel, wherein after each period new entropy information is communicated from the first host to the second host, wherein the new entropy information may be part of entropy information received by the first host from a entropy source or from another host. In yet other embodiments, the transmission of quantum entropy information from the first host to the second host may occur in a continuous manner as a stream of entropy information over the secure communication channel established between the hosts. In some other embodiment, the entropy information may be communicated from the first host to the second host when the second host requests the information. For example, the second host may send a request to the first host requesting entropy information and the first host may then respond to the request by sending the requested entropy information to the requesting second host. Other transmission mechanisms may be used in other embodiments.

The process illustrated in FIG. 5 demonstrates how entropy generated by an entropy source can be received by a host (e.g., the first host) that is directly connected to the entropy source (e.g., quantum entropy generator 705), and further, how the host receiving the entropy information can distribute portions of the entropy to other one or more hosts that are communicatively coupled with the first host. The other hosts may or may not be connected to the entropy source. A host receiving the entropy information can further distribute portions of the received entropy information to other hosts communicatively coupled with that host. In this manner, the entropy information generated by an entropy source can be securely distributed to multiple hosts in a distributed networked environment. The entropy can be forwarded to hosts that are several degrees of separation from the entropy source (e.g., from quantum entropy generator 705) For example, the second host can receive quantum entropy from the first host, and then the second host can forward a portion of the received quantum entropy to the a third host, and the third host can forward it to other connected hosts, and so on.

In the manner described above, the hosts in a network (e.g., in a lattice network) can get access to entropy information, such as quantum entropy, generated by a trusted entropy generation source, even if the hosts are not directly connected to the entropy source. Due to the high quality and trust placed in the quantum entropy information received by a host, the received entropy information can be used for various operations where high trust is needed. For example, the quantum entropy can be used by a host to generate trusted cryptographic keys. These cryptographic keys can be used for different applications, such as, for example, for establishing trusted communication channels between the hosts. The present disclosure describes a method for distribution of quantum entropy generated by a quantum entropy source through an ephemerally keyed lattice cryptographic network to a fleet of hosts (e.g., virtual machine compute instances and/or bare metal compute instances), where a host receiving the quantum entropy may not be connected to the entropy source or may not have a local source of trusted entropy information.

FIG. 6 depicts a simplified flowchart 600 depicting steps performed by a second host during a process for distributing or communicating entropy information generated by a quantum entropy generator 705 to multiple hosts or compute instances according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 6 may be performed by the host B 720. In some embodiments, the second host described below with respect to FIG. 6 can represent the host B 720, and the first host described below with respect to FIG. 6 can represent the host A 710.

The quantum entropy generator 705 (or another suitable trusted source of entropy) can generate quantum entropy. In some embodiments, the quantum entropy generator 705 can generate a stream of quantum entropy that is then available for distribution to one or more connected computer systems.

The first host receives quantum entropy from the quantum entropy generator 705. The first host may be directly connected to the quantum entropy generator 705. In certain embodiments, the host machine hosting the first host may be directly connected to the quantum entropy generator 705. Any suitable amount of quantum entropy generated by quantum entropy generator 705 can be received. For example, 128 bits, 256 bits, 512 bits, 1024 bits, 2048 bits, or any other suitable amount of quantum entropy can be transmitted by the quantum entropy generator 705 and received by the first host. In certain implementations, the quantum entropy may be transmitted in the form of a stream of quantum entropy.

The entropy information is transmitted from quantum entropy generator 705 to the first host over a trusted connection. For example, the entropy information may be communicated over a direct local wired connection between the quantum entropy generator 705 and the first host (or between quantum entropy generator 705 and a host machine hosting the first host) that is not connected to the Internet and/or other networks. The cable used for the wired connection may also be shielded from external interference or tampering or snooping. Additionally or alternatively, the quantum entropy can be transmitted in encrypted form.

The first host can generate a first set of one or more cryptographic keys using a first portion of the quantum entropy received by the first host from the quantum entropy generator 705. For example, the first host can generate a first public key for use in an initial key exchange with the second host for setting up the initial communication channel. The first portion of the quantum entropy can have any suitable size, such as 256 bits or 512 bits of quantum entropy.

As shown in FIG. 6, at S602, the second host generates a second set of one or more cryptographic keys for use in setting up the initial communication channel with the first host. For example, the second host can generate a second public key for use in the initial key exchange with the first host. Since the second host does not yet have access to quantum entropy generated by the quantum entropy generator 705, the second host may use some other entropy information for the key generation process, such as a data string generated by a software-based pseudo-random number generator or another type of potentially untrusted entropy source. This entropy generated by these sources may not be as secure or trusted as the quantum entropy generated by the quantum entropy generator 705.

At S604, the second host can use the first set of one or more cryptographic keys generated by the first host and the second set of cryptographic keys generated in step S602 to establish an initial communication channel with the first host. As part of the processing in S604, the second host and the first host can perform an initial key exchange to create an initial shared key (e.g., a symmetric key). This can involve exchanging information based on the first set of cryptographic keys generated by the first host as well information based on the second set of cryptographic keys generated by the second host in S602. In some embodiments, the information exchange can include an Elliptic-curve Diffie Hellman key agreement protocol.

As described above, the initial communication channel is established using the first set of cryptographic keys that are generated by the first host using a portion of the quantum entropy received by the first host from the quantum entropy generator 705, and using the second set of cryptographic keys generated by the second host using entropy that is not from the quantum entropy generator 705 and thus is not as trustworthy as the entropy information from the quantum entropy generator 705. The initial communication channel is thus a connection of asymmetric entropy-derived cryptographic strength. This initial communication channel can be sufficiently trusted for transmitting at least some secret information to the second host without the secret information being intercepted or compromised. Accordingly, the initial communication channel is used for transmitting a portion of the quantum entropy received by the first host from the quantum entropy generator 705 to the second host as described below for S508.

At S606, the second host receives from the first host a portion (e.g., a second portion) of the quantum entropy received by the first host from the quantum entropy generator 705 via the initial communication channel. In certain implementations, since the initial communication channel is a connection of asymmetric entropy-derived cryptographic strength where only one set of the cryptographic keys used to set up the communication channel are generated using entropy information generated by the quantum entropy generator 705, the first host may take precautions for communicating the entropy information in S606. For example, the entropy information may be communicated from the first host to the second host over the initial communication channel in encrypted form. The first host may first encrypt the portion (second portion) of the quantum entropy to be communicated to the second host and then communicate the encrypted entropy information to the second host. In certain implementations, the entropy information may be encrypted using an initial symmetric key created at step S604. The second host can decrypt the second portion of the quantum entropy upon receipt using the initial symmetric key. The second portion of the quantum entropy can have any suitable size, such as 256 bits or 512 bits of quantum entropy.

After S606, both the first host and the second host have access to entropy information generated by the quantum entropy generator 705. The first host previously received this information (and can receive additional entropy information at this time), while the second host receives the entropy information in S606. Since both sides have the trustworthy entropy information generated by the quantum entropy generator 705, a symmetric entropy-derived cryptographic strength connection can now be set up between the first host and the second host. This is described below with respect to steps S608 and S610.

The first host can generate a third set of one or more cryptographic keys using a portion (e.g., third portion) of the quantum entropy received by the first host from the quantum entropy generator 705. For example, the first host can generate a third public key for use in a second key exchange with the second host for establishment of the secure channel. The third portion of the quantum entropy can have any suitable size, such as 256 bits or 512 bits of quantum entropy.

At S608, the second host can generate a fourth set of one or more cryptographic keys using a portion of the quantum entropy generated by the quantum entropy generator 705 and received by the second host. For example, the second host can generate a fourth public key for use in a second key exchange with the first host for establishment of the secure communication channel. The second host can utilize some or all of the quantum entropy received by the second host when generating the fourth set of cryptographic keys. For example, if the portion of the quantum entropy received the second host has a size of 512 bits, then the second host may utilize the entire 512 bits or a smaller size (e.g., 256 bits) of entropy information for the generation of fourth set of one or more public keys.

At S610, the second host can use the fourth set one or more cryptographic keys generated by the second host in step S608 and the third set of one or more cryptographic keys generated by the first host to establish a secure communication channel between the first host and the second host. In some embodiments, the amount of quantum entropy generator-generated entropy information received by the second host over the initial semi-secure channel in S606 is just sufficient to facilitate the secure communication channel to be set up between the first host and the second host. For example, the amount of entropy information communicated in S606 may just be sufficient to enable the second host to generate the fourth set of cryptographic keys that are used in the establishment of the secure communication channel in S610. As part of the processing in S606, the first host and the second host can perform a second key exchange to create a second shared key (e.g., a symmetric key). This can involve exchanging the fourth set of cryptographic keys generated in S608, as well the third set of cryptographic keys generated by the first host. In some embodiments, this can include an Elliptic-curve Diffie Hellman exchange.

The communication channel established in S610 is a connection of symmetric entropy-derived cryptographic strength since both sets of cryptographic keys that are used to set up the communication channel are generated using entropy information generated by the quantum entropy generator 705. The communication channel established in S610 is thus considered fully secure. This secure communication channel is then used by the second host to receive from the first host further portions of the quantum entropy information received by the first host from quantum entropy generator 705. The communication channel can also be used for other purposes, such as to exchange one or more messages between the second host and the first host.

At S612, the second host can receive additional portions (e.g., a fourth portion) of the quantum entropy generator-generated quantum entropy from the first host via the secure communication channel established in S610. For example, the first host can encrypt a fourth portion of the quantum entropy using the second symmetric key created at step S610, the first host can transmit the encrypted fourth portion of the quantum entropy to the second host, and the second host can decrypt the fourth portion of the quantum entropy using the second symmetric key. In certain implementations, the entropy information may be communicated as a stream of information. A fourth portion of the quantum entropy can have any suitable size, such as 256 bits or 512 bits of quantum entropy.

The second host can utilize the fourth portion of the quantum entropy received from the first host via the secure communication channel in S612. For example, the second host can use the fourth portion of the quantum entropy for the operations of one or more applications.

In certain implementations, in order to maintain the security of the communication channel established in S610, the cryptographic materials (e.g., cryptographic keys) associated with that connections are themselves regenerated to maintain the secure communication channel. For example, as shown in FIG. 6, at S614, after a certain condition is met, the first host and the second host may generate new cryptographic keys that are used to renew the secure communication channel and/or establish a new secure communication channel, where the new cryptographic keys are also generated using portions of the quantum entropy information accessible to the first host and the second host. This may be repeated each time that the regeneration condition is met or occurs. This is sometime referred to as cryptographic keys rotation. Since the cryptographic keys are valid for only a certain period of time before they have to be regenerated, the cryptographic keys are sometimes referred to as ephemeral cryptographic keys.

In one embodiment, both the second host and the first host may generate new sets of one or more cryptographic keys using quantum entropy available to the hosts. For the first host, entropy information used for generating the ephemeral cryptographic keys is received from the quantum entropy generator 705 via the connection between the quantum entropy generator 705 and the first host. In certain implementations, the quantum entropy generator 705 may be configured to continually send a stream of quantum entropy information to the first host. For the second host, the quantum entropy that is used to generate the ephemeral cryptographic keys may have been received by the second host from the first host via the secure communication channel established in S610.

Various different conditions may trigger the regeneration of the cryptographic materials (e.g., cryptographic keys) in S610. In certain implementations, the triggering condition may be time based. For example, a preconfigured time period may be configured for the connection after which regeneration of the cryptographic keys is needed to maintain the channel. This preconfigured time period may be, for example, a certain number of seconds, a certain number of minutes, a certain number of hours, and the like. For example, after 30 seconds, 1 minute, 5 minutes, 10 minutes, 30 minutes, etc.

In some other embodiments, the triggering condition may be based upon a preconfigured number of packets or messages exchanged between the first host and the second host. For example, the regeneration of cryptographic keys may be triggered after 1 packet, 2 packets, 5 packets, 10 packets, 20 packets, or in general after "N" packets. Here, "N" varies with the level of risk exposure tolerance a customer of the entropy has. A higher value of N corresponds to less ephemeral keys and a higher risk exposure to potential entropy tampering. For the lowest possible risk tolerance, the value of N may be set to one. This makes the cryptographic keys highly ephemeral. The cryptographic keys rotation rate can be set based upon the level of risk exposure tolerance desired by a customer of the entropy. The clustering graph network shown in FIG. 1 or 7 represents the highest possible rate of entropy consumption that would be needed to maintain strong ephemeral keys between all connections between all hosts in a network because the product of the key rotation rate with the graph clustering coefficient of the compute network determines the rate at which entropy itself is consumed in the process of distributing entropy to the hosts. Due to rapid key rotation, the level of trust in a connection increases logarithmically with the duration of connections between hosts in the network, multiplied by the inverse of "N". This connection duration is expressed an N above, or the number of packets exchanged between two hosts before those two hosts regenerate their ephemeral keys.

As indicated above, the particular sequence or order of steps depicted in FIG. 6 is not intended to be limiting. In certain alternative embodiments, the steps may be performed in some different order or some steps may also be performed in parallel.

In the embodiment depicted in FIG. 6 and described, quantum entropy information generated by quantum entropy generator 705 is transmitted to the first host. In certain implementations, this transmission of entropy information from an entropy source to a host that is directly connected to the entropy source may occur as a one-time event. In other implementations, the transmission of quantum entropy information from an entropy source to a host directly connected to the entropy source may occur periodically, wherein after each period new entropy information generated by the entropy source is communicated to the connected host. In yet other embodiments, the transmission of quantum entropy information from an entropy source to a host directly connected to the entropy source may occur in a continuous manner as a stream of entropy information that is generated by the entropy source and communicated to the connected host. In some other embodiment, the entropy information may be communicated from a entropy source to a host when the host request the information. For example, the host may send a request to the entropy source requesting entropy information and the entropy source may then respond to the request by sending the requested entropy information generated by the entropy source to the requesting host. Other transmission mechanisms may be used in other embodiments.

The transmission of entropy information from one host to another host (e.g., from the first host to the second host) may also occur according to various different modes. In one embodiment, a first host may communicate the entropy information to a second host as a one-time event over a secure communication channel established between the two hosts. In other implementations, the transmission of quantum entropy information from the first host to the second host may occur periodically over the secure communication channel, wherein after each period new entropy information is communicated from the first host to the second host, wherein the new entropy information may be part of entropy information received by the first host from a entropy source or from another host. In yet other embodiments, the transmission of quantum entropy information from the first host to the second host may occur in a continuous manner as a stream of entropy information over the secure communication channel established between the hosts. In some other embodiment, the entropy information may be communicated from the first host to the second host when the second host requests the information. For example, the second host may send a request to the first host requesting entropy information and the first host may then respond to the request by sending the requested entropy information to the requesting second host. Other transmission mechanisms may be used in other embodiments.

The process illustrated in FIG. 6 demonstrates how entropy generated by an entropy source can be received by a host (e.g., the second host) from another host (e.g., the first host) that is communicatively coupled to the second host, where the first host initially received the entropy from the entropy source (e.g., quantum entropy generator 705). The second host may or may not be connected to the entropy source. A second host receiving the entropy information can further distribute portions of the received entropy information to other hosts that are also communicatively coupled with the second host. In this manner, the entropy information generated by an entropy source can be securely distributed to multiple hosts in a distributed networked environment. The entropy can be forwarded to hosts that are several degrees of separation from the entropy source (e.g., from quantum entropy generator 705) For example, the second host can receive quantum entropy from the first host, and then the second host can forward a portion of the received quantum entropy to the a third host, and the third host can forward it to other connected hosts, and so on.

In the manner described above, the hosts in a network (e.g., in a lattice network) can get access to entropy information, such as quantum entropy, generated by a trusted entropy generation source, even if the hosts are not directly connected to the entropy source. Due to the high quality and trust placed in the quantum entropy information received by a host, the received entropy information can be used for various operations where high trust is needed. For example, the quantum entropy can be used by a host to generate trusted cryptographic keys. These cryptographic keys can be used for different applications, such as, for example, for establishing trusted communication channels between the hosts. The present disclosure describes a method for distribution of quantum entropy generated by a quantum entropy source through an ephemerally keyed lattice cryptographic network to a fleet of hosts (e.g., virtual machine compute instances and/or bare metal compute instances), where a host receiving the quantum entropy may not be connected to the entropy source or may not have a local source of trusted entropy information.

Figure 8:
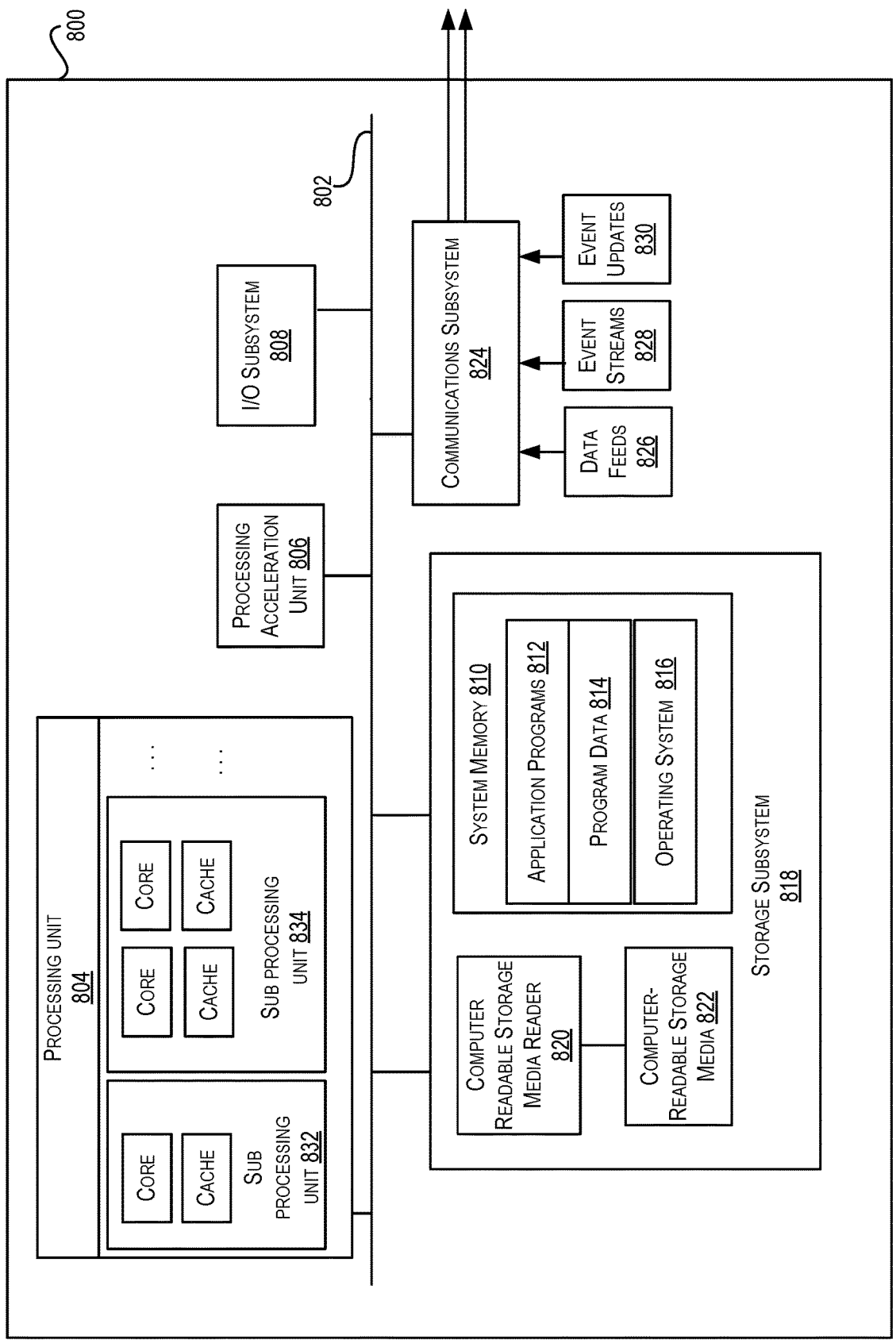
FIG. 8 illustrates an exemplary computer system that may be used to implement certain embodiments.

FIG. 8 illustrates an exemplary computer system 800 that may be used to implement certain embodiments. For example, in some embodiments, computer system 800 may be used to implement any of the hosts or computer systems shown in FIG. 1 and/or FIG. 7, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to establish communication channels and/or transmit quantum entropy to other computers.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments provides an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method, comprising:
generating, by a second host, a second cryptographic key in preparation for establishing a first communication channel between the second host and a first host, where the first host receives entropy information from an entropy source, the entropy information including a first portion, a second portion, a third portion, and a fourth portion, and where the first host generates a first cryptographic key using the first portion of the entropy information in preparation for establishing the first communication channel between the second host and the first host, wherein the first host is a first computer system or a first virtual machine compute instance running on the first computer system, and the second host is a second computer system or a second virtual machine compute instance running on the first computer system or the second computer system;
establishing the first communication channel between the second host and the first host by performing a first key exchange with the second cryptographic key and the first cryptographic key;

receiving, by the second host, the second portion of the entropy information from the first host using the first communication channel;

generating, by the second host, a fourth cryptographic key using the second portion of the entropy information, where the first host generates a third cryptographic key using the third portion of the entropy information;

establishing a second communication channel between the second host and the first host by performing a second key exchange with the fourth cryptographic key and the third cryptographic key; and receiving, by the second host, the fourth portion of the entropy information from the first host using the second communication channel established between the second host and the first host.

2. The method of claim 1, wherein the first key exchange is a first ephemeral Diffie-Hellman key exchange, and the second key exchange is a second ephemeral Diffie-Hellman key exchange.

3. The method of claim 2, wherein the first ephemeral Diffie-Hellman key exchange is a first ephemeral Elliptic-curve Diffie-Hellman key exchange, and wherein the second ephemeral Diffie-Hellman key exchange is a second ephemeral Elliptic-curve Diffie-Hellman key exchange.

4. The method of claim 2, wherein the second portion of the entropy information includes "N" bits, wherein "N" is a number of bits, and wherein the fourth cryptographic key is generated based on the "N" bits.

5. The method of claim 1, wherein the entropy information further includes a fifth portion and a sixth portion, and further comprising:

receiving, by the second host, the sixth portion of the entropy information from the first host using the second communication channel;

regenerating, by the second host, a second new cryptographic key using the sixth portion of the entropy information, wherein the first host regenerates a first new cryptographic key using the fifth portion of the entropy information; and renewing the second communication channel between the second host and the first host based upon the second new cryptographic key and the first new cryptographic key.

6. The method of claim 5, further comprising:

before the regenerating the second new cryptographic key, determining that a certain period of time has elapsed.

7. The method of claim 5, further comprising:

before the regenerating the second new cryptographic key, determining that a certain number of packets have been exchanged between the second host and the first host.

8. The method of claim 1, wherein the entropy source is a quantum entropy generator, and the entropy information is quantum entropy information.

9. A non-transitory computer-readable storage medium, storing computer-executable instructions that, when executed, cause one or more processors of a computer system at a second host to perform a method comprising:

generating a second cryptographic key in preparation for establishing a first communication channel between the second host and a first host, where the first host receives entropy information from an entropy source, the entropy information including a first portion, a second portion, a third portion, and a fourth portion, and where the first host generates a first cryptographic key using the first portion of the entropy information in preparation for establishing the first communication channel between the second host and the first host;

establishing the first communication channel between the second host and the first host by performing a first key exchange with the second cryptographic key and the first cryptographic key;

receiving the second portion of the entropy information from the first host using the first communication channel;

generating a fourth cryptographic key using the second portion of the entropy information, where the first host generates a third cryptographic key using the third portion of the entropy information;

establishing a second communication channel between the second host and the first host by performing a second key exchange with the fourth cryptographic key and the third cryptographic key; and receiving the fourth portion of the entropy information from the first host using the second communication channel established between the second host and the first host.

10. The non-transitory computer-readable storage medium of claim 9, wherein the first key exchange is a first ephemeral Diffie-Hellman key exchange, and the second key exchange is a second ephemeral Diffie-Hellman key exchange.

11. The non-transitory computer-readable storage medium of claim 10, wherein the first ephemeral Diffie-Hellman key exchange is a first ephemeral Elliptic-curve Diffie-Hellman key exchange, and wherein the second ephemeral Diffie-Hellman key exchange is a second ephemeral Elliptic-curve Diffie-Hellman key exchange.

12. The non-transitory computer-readable storage medium of claim 9, wherein the entropy information further includes a fifth portion and a sixth portion, and the method further comprises:

receiving the sixth portion of the entropy information from the first host using the second communication channel;

regenerating a second new cryptographic key using the sixth portion of the entropy information, wherein the first host regenerates a first new cryptographic key using the fifth portion of the entropy information; and establishing a new communication channel between the second host and the first host based upon the second new cryptographic key and the first new cryptographic key.

13. A second computer system comprising:

a processor; and a memory configured to store a plurality or instructions executable by the processor and upon execution by the processor to cause processing to be performed comprising:

generating a second cryptographic key in preparation for establishing a first communication channel between the second computer system and a first computer system, where the first computer system receives entropy information from an entropy source, the entropy information including a first portion, a second portion, a third portion, and a fourth portion, and where the first computer system generates a first cryptographic key using the first portion of the entropy information in preparation for establishing the first communication channel between the second computer system and the first computer system;

establishing the first communication channel between the second computer system and the first computer system by performing a first key exchange with the second cryptographic key and the first cryptographic key;

receiving the second portion of the entropy information from the first computer system using the first communication channel;

generating a fourth cryptographic key using the second portion of the entropy information, where the first computer system generates a third cryptographic key using the third portion of the entropy information;

establishing a second communication channel between the second computer system and the first computer system by performing a second key exchange with the fourth cryptographic key and the third cryptographic key; and receiving the fourth portion of the entropy information from the first computer system using the second communication channel established between the second computer system and the first computer system.

14. The second computer system of claim 13, wherein the first key exchange is a first ephemeral Diffie-Hellman key exchange, and the second key exchange is a second ephemeral Diffie-Hellman key exchange.

15. The second computer system of claim 14, wherein the first ephemeral Diffie-Hellman key exchange is a first ephemeral Elliptic-curve Diffie-Hellman key exchange, and wherein the second ephemeral Diffie-Hellman key exchange is a second ephemeral Elliptic-curve Diffie-Hellman key exchange.

* * * * *